(12) United States Patent
Muruganathan et al.

(10) Patent No.: US 10,833,747 B2
(45) Date of Patent: Nov. 10, 2020

(54) MECHANISMS FOR REDUCED DENSITY CSI-RS

(71) Applicant: Telefonaktiebolaget LM Ericsson (publ), Stockholm (SE)

(72) Inventors: Siva Muruganathan, Stittsville (CA); Mattias Frenne, Uppsala (SE); Shiwei Gao, Nepean (CA); Stephen Grant, Pleasanton, CA (US); Robert Mark Harrison, Grapevine, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/301,219

(22) PCT Filed: May 15, 2017

(86) PCT No.: PCT/SE2017/050502
§ 371 (c)(1),
(2) Date: Nov. 13, 2018

(87) PCT Pub. No.: WO2017/196253
PCT Pub. Date: Nov. 16, 2017

(65) Prior Publication Data
US 2019/0372641 A1    Dec. 5, 2019

Related U.S. Application Data
(60) Provisional application No. 62/335,989, filed on May 13, 2016.

(51) Int. Cl.
*H04B 7/06* (2006.01)
*H04B 7/0456* (2017.01)
(Continued)

(52) U.S. Cl.
CPC ......... *H04B 7/0626* (2013.01); *H04B 7/0456* (2013.01); *H04B 7/0617* (2013.01);
(Continued)

(58) Field of Classification Search
CPC .. H04W 72/0446; H04W 24/10; H04L 5/005; H04L 5/0023; H04L 5/0091; H04B 7/0626; H04B 7/0617; H04B 7/0456
See application file for complete search history.

(56) References Cited

U.S. PATENT DOCUMENTS

2013/0194931 A1*  8/2013  Lee ................... H04L 5/0053
                                                              370/241
2013/0208604 A1*  8/2013  Lee ................... H04L 25/0226
                                                              370/252
(Continued)

FOREIGN PATENT DOCUMENTS

RU    2 486 687 C2    6/2013
RU    2 540 588 C2    2/2015

OTHER PUBLICATIONS

NPL-3GPP TSG-RAN WG1 Meeting#84bis, Busan, Korea; Source: ZTE; Title-Discussion on non-precoded CSI-RS design for eFD-MIMO (R1-162345); Date; Apr. 11-15, 2016 (Year: 2016).*
(Continued)

*Primary Examiner* — Lan-Huong Truong
(74) *Attorney, Agent, or Firm* — Baker Botts, LLP

(57) ABSTRACT

According to some embodiments, a method for use in a network node of transmitting channel state information reference signals (CSI-RS) comprises: transmitting, to the wireless device, an indication of the subset of PRBs that the wireless device should use to measure CSI-RS; and transmitting CSI-RS on the indicated subset of PRBs. According to some embodiments, a method for use in a wireless device of receiving CSI-RS comprises: receiving an indication of a subset of PRBs that the wireless device should use to
(Continued)

CSI-RS resources

Cell 1

Cell 2

Cell 3

▦ Cell 1 NZP CSI-RS resource

▤ Cell 2 NZP CSI-RS resource

▨ Cell 3 NZP CSI-RS resource

☐ ZP CSI-RS resources measure CSI-RS associated with an antenna port; and receiving CSI-RS on the indicated subset of PRBs. In some embodiments, the indication of the subset of PRBs that the wireless device should use to measure CSI-RS comprises a density value and a comb offset.

23 Claims, 22 Drawing Sheets

(51) Int. Cl.
  *H04L 5/00* (2006.01)
  *H04W 24/10* (2009.01)
  *H04W 72/04* (2009.01)

(52) U.S. Cl.
  CPC ............ *H04L 5/005* (2013.01); *H04L 5/0023* (2013.01); *H04W 24/10* (2013.01); *H04W 72/0446* (2013.01)

(56) References Cited

U.S. PATENT DOCUMENTS

| | | | |
|---|---|---|---|
| 2014/0192762 A1* | 7/2014 | Li | H04B 7/0486 370/329 |
| 2014/0226541 A1* | 8/2014 | Xu | H04W 56/0015 370/280 |
| 2015/0124758 A1 | 5/2015 | Kim et al. | |
| 2015/0201346 A1* | 7/2015 | Wu | H04L 5/001 370/252 |
| 2015/0244444 A1* | 8/2015 | Mazzarese | H04B 7/04 370/252 |
| 2016/0013906 A1 | 1/2016 | Guo et al. | |
| 2016/0112099 A1 | 4/2016 | Lee et al. | |
| 2016/0192385 A1* | 6/2016 | Tooher | H04L 5/0051 370/336 |
| 2016/0301511 A1* | 10/2016 | Yoon | H04L 5/0057 |
| 2019/0036574 A1* | 1/2019 | Zhu | H04B 7/0639 |

OTHER PUBLICATIONS

3GPP TS 36.211 v13.0,0; Technical Specification; 3rd Generation Partnership Project; Technical Specification Group Radio Access Network; Evolved Universal Terrestrial Radio Access (E-UTRA); Physical channels and modulation (Release 13)—Dec. 2015.

3GPP TS 36,213 v13,0.1; Technical Specification; 3rd Generation Partnership Project; Technical Specification Group Radio Access Network; Evolved Universal Terrestrial Radio Access (E-UTRA); Physical layer procedures (Release 13)—Jan. 2016.

3GPP TS 36.331 v13.1.0; Technical Specification; 3rd Generation Partnership Project; Technical Specification Group Radio Access Network; Evolved Universal Terrestrial Radio Access (E-UTRA); Radio Resource Control (RRC); Protocol specification (Release 13)—Mar. 2016.

3GPP TSG RAN WG1 Meeting #84bis; Busan, Korea; Source: ZTE; Title: Enhancements on Beamformed CSI-RS (R1-162346)—Apr. 11-15, 2016.

3GPP TSG-RAN WG1 #84bis; Busan, Korea, Source: Ericsson; Title: CSI-RS Design for Class a eFD-MIMO (R1-163079)—Apr. 11-15, 2016.

PCT International Search Report for International application No. PCT/SE2017/050502—dated Jul. 25, 2017.

ETSI TS 136 212 v13.0.0; Technical Specification; LTE; Evolved Universal Terrestrial Radio Access (E-UTRA); Multiplexing and channel coding (3GPP TS 36.212 version 13.0.0. Release 13) due to size, this reference has been split into three parts—Jan. 2016.

PCT Written Opinion of the International Searching Authority for International application No. PCT/SE2017/050502—dated Jul. 25, 2017.

Instituto Nacional de Propiedad Industrial (National Institute of Industrial Property of Chile), INAPI, Chilean Office Action dated Jul. 19, 2019, Expert Report on Invention Patent Application for Application No. 201803222, PCT 2018-003222 (English translation attached), 13 total pages.

3GPP TSG RAN WG1 Meeting #84bis; Busan, Korea; Source: ZTE; Title: Discussion on non-precoded CSI-RS design for eFD-MIMO (R1-162345), Apr. 11-15, 2016, 5 pages.

Russian Search Report issued for Application No. 2018144016/07 (073374) dated Jun. 23, 2020.

* cited by examiner

MECHANISMS FOR REDUCED DENSITY CSI-RS

PRIORITY

This nonprovisional application is a U.S. National Stage Filing under 35 U.S.C. § 371 of International Patent Application Serial No. PCT/SE2017/050502 filed May 15, 2017 and entitled "Mechanisms for Reduced Density CSI-RS" which claims priority to U.S. Provisional Patent Application No. 62/335,989 filed May 13, 2016 both of which are hereby incorporated by reference in their entirety.

TECHNICAL FIELD

Particular embodiments are directed to wireless communications and, more particularly, to mechanisms for reduced density channel state information reference signal (CSI-RS).

BACKGROUND

Third Generation Partnership Project (3GPP) Long Term Evolution (LTE) uses Orthogonal Frequency Division Multiplexing (OFDM) in the downlink, where each downlink symbol may be referred to as an OFDM symbol, and Discrete Fourier Transform (DFT)-spread OFDM in the uplink, where each uplink symbol may be referred to as an SC-FDMA symbol. The basic LTE downlink physical resource comprises a time-frequency grid as illustrated in FIG. 1.

The next generation mobile wireless communication system (5G or NR), supports a diverse set of use cases and a diverse set of deployment scenarios. The later includes deployment at both low frequencies (100 s of MHz), similar to LTE today, and very high frequencies (mm waves in the tens of GHz). At high frequencies, propagation characteristics make achieving good coverage challenging. One solution to the coverage issue is to employ high-gain beamforming, typically in an analog manner, to achieve satisfactory link budget. Beamforming may also be used at lower frequencies (typically digital beamforming), and is expected to be similar in nature to the already standardized 3GPP LTE system (4G).

FIG. 1 illustrates an example downlink radio subframe. The horizontal axis represents time and the other axis represents frequency. Radio subframe 10 includes resource elements 12. Each resource element 12 corresponds to one OFDM subcarrier during one OFDM symbol interval. In the time domain, LTE downlink transmissions may be organized into radio frames.

LTE and NR use OFDM in the downlink and DFT-spread OFDM or OFDM in the uplink. The basic LTE or NR downlink physical resource can thus be seen as a time-frequency grid as illustrated in FIG. 1, where each resource element corresponds to one OFDM subcarrier during one OFDM symbol interval. Although a subcarrier spacing of $\Delta f=15$ kHz is shown in FIG. 1, different subcarrier spacing values are supported in NR. The supported subcarrier spacing values (also reference to as different numerologies) in NR are given by $\Delta f=(15\times 2^\alpha)$ kHz where $\alpha$ is a non-negative integer.

FIG. 2 illustrates an example radio frame. Radio frame 14 includes subframes 10. In LTE, each radio frame 14 is 10 ms and consists of ten equally-sized subframes 10 of length Tsubframe=1 ms. In LTE, for normal cyclic prefix, one subframe consists of 14 OFDM symbols and the duration of each symbol is approximately 71.4 µs. In NR, subframe length is fixed at 1 ms regardless of the numerology used. In NR, the slot duration for a numerology of $(15\times 2^\alpha)$ kHz is given by $\frac{1}{2}^\alpha$ ms assuming 14 OFDM symbols per slot, and the number of slots per subframe depends on the numerology.

Users are allocated a specific number of subcarriers for a predetermined amount of time. These are referred to as physical resource blocks (PRBs). PRBs thus have both a time and frequency dimension. In LTE, a resource block corresponds to one slot (0.5 ms) in the time domain and 12 contiguous subcarriers in the frequency domain. Resource blocks are numbered in the frequency domain, starting with 0 from one end of the system bandwidth. For NR, a resource block is also 12 subcarriers in frequency but may span one or more slots in the time domain.

Downlink transmissions are dynamically scheduled, i.e., in each subframe the base station transmits control information about to which terminals data is transmitted and upon which resource blocks the data is transmitted, in the current downlink subframe. In LTE, the control signaling is typically transmitted in the first 1, 2, 3 or 4 OFDM symbols in each subframe.

FIG. 3 illustrates an example downlink subframe. Subframe 10 includes reference symbols and control signaling. In the illustrated example, the control region includes 3 OFDM symbols. The reference symbols include cell specific reference symbols (CRS) which may support multiple functions including fine time and frequency synchronization and channel estimation for certain transmission modes.

LTE includes a number of physical downlink channels. A downlink physical channel corresponds to a set of resource elements carrying information originating from higher layers. The following are some of the physical channels supported in LTE: Physical Downlink Shared Channel (PDSCH); Physical Downlink Control Channel (PDCCH); Enhanced Physical Downlink Control Channel (EPDCCH); Physical Uplink Shared Channel (PUSCH); and Physical Uplink Control Channel (PUCCH).

PDSCH is used mainly for carrying user traffic data and higher layer messages. PDSCH is transmitted in a downlink subframe outside of the control region as shown in FIG. 3. Both PDCCH and EPDCCH are used to carry Downlink Control Information (DCI) such as PRB allocation, modulation level and coding scheme (MCS), precoder used at the transmitter, etc. PDCCH is transmitted in the first one to four OFDM symbols in a downlink subframe (i.e., the control region), while EPDCCH is transmitted in the same region as PDSCH.

LTE defines different DCI formats for downlink and uplink data scheduling. For example, DCI formats 0 and 4 are used for uplink data scheduling while DCI formats 1, 1A, 1B, 1C, 1D, 2, 2A, 2B, 2C, 2D, 3/3A are used for downlink data scheduling. Two search spaces are defined for PDCCH (i.e., a common search space and a UE specific search space).

The common search space consists of PDCCH resources over which all user equipment (UEs) monitor for PDCCH(s). A PDCCH intended for all or a group of UEs is always transmitted in the common search space so all UEs can receive it.

The UE specific search space consists of PDCCH resources that can vary from UE to UE. A UE monitors both the common search space and the UE specific search space associated with it for PDCCH(s). DCI IC carries information for PDSCH intended for all UEs or for UEs that have not been assigned with a Radio Network Temporary Identifier (RNTI), so it is always transmitted in the common search space. DCI 0 and DCI 1A can be transmitted on either common or UE specific search space. DCI 1B, 1D, 2, 2A, 2C and 2D are always transmitted on UE specific search space.

In downlink, which DCI format is used for data scheduling is associated with a downlink transmission scheme and/or the type of message to be transmitted. The following are some of the transmission schemes supported in LTE: single-antenna port; transmit diversity (TxD); open-loop spatial multiplexing; closed-loop spatial multiplexing; and up to 8 layer transmission.

PDCCH is always transmitted with either the single-antenna port or TxD scheme while PDSCH can use any one of the transmission schemes. In LTE, a UE is configured with a transmission mode (TM), rather than a transmission scheme. There are 10 TMs (i.e., TM1 to TM10) defined for PDSCH in LTE. Each TM defines a primary transmission scheme and a backup transmission scheme. The backup transmission scheme is either single antenna port or TxD. The primary transmission schemes in LTE include: TM1: single antenna port, port 0; TM2: TxD; TM3: open-loop SM; TM4: closed-loop SM; TM9: up to 8 layer transmission, port 7-14; and TM10: up to 8 layer transmission, port 7-14.

In TM1 to TM6, cell specific reference signal (CRS) is used as the reference signal for both channel state information feedback and for demodulation at a UE. In TM7 to TM10, UE specific demodulation reference signal (DMRS) is used as the reference signal for demodulation.

LTE includes codebook-based precoding. Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

A core component in LTE is the support of MIMO antenna deployments and MIMO related techniques. Currently, up to 8-layer spatial multiplexing with 2, 4, 8, 16 1D transmit (Tx) antenna ports and 8,12, and 16 Tx 2D antenna ports are supported in LTE with channel dependent precoding. The spatial multiplexing mode is aimed for high data rates in favorable channel conditions. FIG. 4 illustrates example spatial multiplexing operation.

FIG. 4 is a block diagram illustrating the logical structure of precoded spatial multiplexing mode in LTE. The information carrying symbol vector s is multiplied by an $N_T \times r$ precoder matrix W, which serves to distribute the transmit energy in a subspace of the $N_T$ (corresponding to $N_T$ antenna ports) dimensional vector space.

The precoder matrix is typically selected from a codebook of possible precoder matrices, and is typically indicated by a precoder matrix indicator (PMI), which specifies a unique precoder matrix in the codebook for a given number of symbol streams. The r symbols in s each correspond to a layer and r is referred to as the transmission rank. Spatial multiplexing is achieved because multiple symbols can be transmitted simultaneously over the same time/frequency resource element (TFRE). The number of symbols r is typically adapted to suit the current channel properties.

LTE uses OFDM in the downlink (and DFT precoded OFDM in the uplink). The received $N_R \times 1$ vector $y_n$ for a certain TFRE on subcarrier n (or alternatively data TFRE number n) is thus modeled by $$y_n = H_n W s_n + e_n \quad \text{Equation 1}$$

where $e_n$ is a noise/interference vector. The precoder W can be a wideband precoder, which is constant over frequency, or frequency selective.

The precoder matrix is often chosen to match the characteristics of the $N_R \times N_T$ MIMO channel matrix $H_n$, which may be referred to as channel dependent precoding. This is also commonly referred to as closed-loop precoding and essentially attempts to focus the transmit energy into a subspace which is strong in the sense of conveying much of the transmitted energy to the UE. In addition, the precoder matrix may also be selected to orthogonalize the channel, meaning that after proper linear equalization at the UE, the inter-layer interference is reduced.

The transmission rank, and thus the number of spatially multiplexed layers, is reflected in the number of columns of the precoder. For efficient performance, a transmission rank may be selected to match the channel properties.

MIMO includes single user MIMO and multi user MIMO. Transmitting all the data layers to one UE is referred to as single user MIMO (SU-MIMO). Transmitting the data layers to multiple UEs is referred to as multi-user MIMO (MU-MIMO).

MU-MIMO is possible when, for example, two UEs are located in different areas of a cell such that they can be separated through different precoders (or beamforming) at the base transceiver station (BTS), i.e., base station (BS). The two UEs may be served on the same time-frequency resources (i.e., PRBs) by using different precoders or beams.

In Demodulation Reference Signal (DMRS) based transmission modes TM9 and TM10, different DMRS ports and/or the same DMRS port with different scrambling codes can be assigned to the different UEs for MU-MIMO transmission. In this case, MU-MIMO is transparent to the UE (i.e., a UE is not informed about the co-scheduling of another UE in the same PRBs). MU-MIMO requires more accurate downlink channel information than SU-MIMO for the eNB to use precoding to separate the UEs (i.e., reducing cross interference to the co-scheduled UEs).

LTE includes codebook based channel state information (CSI) estimation and feedback. In closed loop MIMO transmission schemes such as TM9 and TM10, a UE estimates and feeds back the downlink CSI to the eNB. The eNB uses the feedback CSI to transmit downlink data to the UE. The CSI consists of a transmission rank indicator (RI), a precoding matrix indicator (PMI) and a channel quality indicator(s) (CQI).

A codebook of precoding matrices is used by the UE to find the best match between the estimated downlink channel $H_n$ and a precoding matrix in the codebook based on certain criteria (e.g., UE throughput). The channel $H_n$ is estimated based on a Non-Zero Power CSI reference signal (NZP CSI-RS) transmitted in the downlink for TM9 and TM10.

The CQI/RI/PMI together provide the downlink channel state to the UE. This is also referred to as implicit CSI feedback because the estimation of $H_n$ is not fed back directly. The CQI/RI/PMI can be wideband or subband depending on the configured reporting mode.

The RI corresponds to a recommended number of streams that are to be spatially multiplexed and thus transmitted in parallel over the downlink channel. The PMI identifies a recommended precoding matrix codeword (in a codebook which contains precoders with the same number of rows as the number of CSI-RS ports) for the transmission, which relates to the spatial characteristics of the channel. The CQI represents a recommended transport block size (i.e., code rate) and LTE supports transmission of one or two simultaneous (on different layers) transmissions of transport blocks (i.e., separately encoded blocks of information) to a UE in a subframe. There is thus a relation between a CQI and a signal to interference and noise ratio (SINR) of the spatial stream(s) over which the transport block or blocks are transmitted.

LTE defines codebooks of up to 16 antenna ports. Both one dimension (1D) and two-dimension (2D) antenna arrays are supported. For LTE Rel-12 UE and earlier, only a codebook feedback for a 1D port layout is supported, with 2, 4 or 8 antenna ports. Thus, the codebook is designed assuming the ports are arranged on a straight line. In LTE Rel-13, codebooks for 2D port layouts were specified for the case of 8, 12, or 16 antenna ports. In addition, a codebook 1D port layout for the case of 16 antenna ports was also specified in LTE Rel-13.

LTE Rel-13 includes two types of CSI reporting: Class A and Class B. In Class A CSI reporting, a UE measures and reports CSI based on a new codebook for the configured 2D antenna array with 8, 12 or 16 antenna ports. The CSI consists of a RI, a PMI and a CQI or CQIs, similar to the CSI reporting in pre Rel-13.

In Class B CSI reporting, in one scenario (referred to as "K>1"), the eNB may pre-form multiple beams in one antenna dimension. There can be multiple ports (1, 2, 4, or 8 ports) within each beam on the other antenna dimension. Beamformed CSI-RS are transmitted along each beam. A UE first selects the best beam from a group of beams configured and then measures CSI within the selected beam based on the legacy codebook for 2, 4, or 8 ports. The UE then reports back the selected beam index and the CSI corresponding to the selected beam.

In another scenario (referred to as "K=1"), the eNB may form up to 4 (2D) beams on each polarization and beamformed CSI-RS is transmitted along each beam. A UE measures CSI on the beamformed CSI-RS and feedback CSI based on a new Class B codebook for 2, 4, 8 ports.

LTE supports two types of CSI feedbacks: period feedback and aperiodic feedback. In periodic CSI feedback, a UE is configured to report CSI periodically on certain preconfigured subframes. The feedback information is carried on the uplink PUCCH channel.

In aperiodic CSI feedback, a UE only reports CSI when it is requested. The request is signaled on an uplink grant (i.e., either in DCI 0 or DCI 4 carried on PDCCH or EPDCCH).

LTE Release-10 includes a new reference symbol sequence to estimate channel state information referred to as non-zero power (NZP) CSI-RS. The NZP CSI-RS provides several advantages over basing the CSI feedback on the cell-specific reference symbols (CRS) that were used for that purpose in previous releases.

As one example, the NZP CSI-RS is not used for demodulation of the data signal, and thus does not require the same density (i.e., the overhead of the NZP CSI-RS is substantially less). As another example, NZP CSI-RS provides a more flexible means to configure CSI feedback measurements (e.g., which NZP CSI-RS resource to measure on can be configured in a UE specific manner). By measuring on a NZP CSI-RS, a UE can estimate the effective channel that the NZP CSI-RS is traversing, including the radio propagation channel and antenna gains.

Up to eight NZP CSI-RS ports can be configured for a LTE Rel-11 UE. The UE can estimate the channel from up to eight transmit antenna ports in LTE Rel-11. Up to LTE Rel-12, the NZP CSI-RS utilizes an orthogonal cover code (OCC) of length two to overlay two antenna ports on two consecutive REs. OCC may be interchangeably referred to as code division multiplexing (CDM).

Many different NZP CSI-RS patterns are available. Examples are illustrated in FIG. 5.

FIG. 5 illustrates resource element grids with resource block pairs showing potential positions for CSI-RS for 2, 4, and 8 antenna ports. Each resource element grid represents one PRB 16. The horizontal axis represents the time domain and the vertical axis represents the frequency domain.

For 2 CSI-RS antenna ports, FIG. 5 illustrates the 20 different patterns within a subframe (i.e., the 20 pairs of resource elements labelled 0 and 1). One example pattern is illustrated with cross-hatching.

For 4 CSI-RS antenna ports, the corresponding number of patterns is 10 (i.e., the 10 groups of resource elements labelled 0-3, where resource element pair 0 and 1 and resource element pair 2 and 3 within the same group are separated by 6 resource elements in the frequency domain). One example pattern is illustrated with cross-hatching.

For 8 CSI-RS antenna ports, the corresponding number of patterns is 5 (i.e., the 5 groups of resource elements labelled 0-7, where resource element pair 0 and 1 and resource element pair 2 and 3 within the same group are separated by 6 resource elements in the frequency domain and resource element pair 4 and 5 and resource element pair 6 and 7 within the same group are separated by 6 resource elements in the frequency domain). One example pattern is illustrated with cross-hatching.

The illustrated examples are for frequency division duplex (FDD). For time division duplex (TDD), additional CSI-RS patterns are available.

The reference-signal sequence for CSI-RS is defined in Section 6.10.5.1 of 3GPP TS 36.211 as $$r_{l,n_s}(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, N_{RB}^{max,DL} - 1$$

Equation 2 where $n_s$ is the slot number within a radio frame and l is the OFDM symbol number within the slot. The pseudo-random sequence c(i) is generated and initialized according to Sections 7.2 and 6.10.5.1 of 3GPP TS 36.211, respectively. Furthermore, in Equation 2, $N_{RB}^{max,DL}=110$ is the largest downlink bandwidth configuration supported by 3GPP TS 36.211.

In LTE Rel-13, the NZP CSI-RS resource is extended to include 12 and 16 ports. Such Rel-13 NZP CSI-RS resource is obtained by aggregating three legacy 4 port CSI-RS resources (to form a 12 port NZP CSI-RS resource) or two legacy 8 port CSI-RS resources (to form a 16 port NZP CSI-RS resource). All aggregated NZP CSI-RS resources are located in the same subframe. Examples of forming 12 port and 16 port NZP CSI-RS resources are shown in FIGS. 6A and 6B, respectively.

FIGS. 6A and 6B illustrate resource element grids with resource block pairs showing potential positions for CSI-RS for 12 and 16 antenna ports, respectively. The horizontal axis represents the time domain and the vertical axis represents the frequency domain.

FIG. 6A illustrates an example of aggregating three 4-port resources to form a 12-port NZP CSI-RS resource. Each resource element of the same 4-port resource is labeled with the same number (e.g., the four resources labeled 1 form one 4-port resource, the four resources labeled 2 form a second 4-port resource, and the four resources labeled 3 form a third 4-port resource). Together, the three aggregated 4-port resources form a 12 port resource.

FIG. 6B illustrates an example of aggregating two 8-port resources to form a 16-port NZP CSI-RS resource. Each resource element of the same 8-port resource is labeled with the same number (e.g., the eight resources labeled 1 form one 8-port resource, and the eight resources labeled 2 form a second 8-port resource). Together, the two aggregated 8-port resources form a 16 port resource.

In a given subframe, three 12-port resource configurations (i.e., nine out of ten 4-port resources used) and two 16-port resource configurations (i.e., four out of five 8-port resources used) are possible. The following port numbering is used for the aggregated NZP CSI-RS resources. For 16 NZP CSI-RS ports, the aggregated port numbers are 15, 16, 17, 18, 19, 20, 21, 22, 23, 24, 25, 26, 27, 28, 29 and 30. For 12 NZP CSI-RS ports, the aggregated port numbers are 15, 16, 17, 18, 19, 20, 21, 22, 23, 24, 25 and 26.

In addition, Rel-13 NZP CSI-RS design supports two different OCC lengths. Multiplexing antenna ports is possible using OCC lengths two and four for both 12-port and 16-port NZP CSI-RS. Up to Release 13 in LTE, CSI-RS is transmitted in all PRBs in the system bandwidth with a density of 1 RE/port/PRB.

Examples using OCC length two are illustrated in FIGS. 7 and 8. Examples using OCC length four are illustrated in FIGS. 9 and 10.

FIG. 7 illustrates a resource element grid with an example NZP CSI-RS design for 12 ports with OCC length 2. The different 4-port NZP CSI-RS resources are denoted by the letters A-J. For example, 4-port resources A, F, and J could be aggregated to form a 12-port NZP CSI-RS resource. The length 2 OCC is applied across two resource elements with the same sub-carrier index and adjacent OFDM symbol indices (e.g., OCC 2 is applied to the resource elements with OFDM symbol indices 5-6 and sub-carrier index 9 in slot 0).

FIG. 8 illustrates a resource element grid with an example NZP CSI-RS design for 16 ports with OCC length 2. The different 8-port NZP CSI-RS resources are indicated by number (e.g., 0-4). The resource pairs that comprise the 8-port resource are indicated by letter (e.g., A-D). For example, the resource pairs A0, B0, C0 and D0 form one 8-port NZP CSI-RS resource. The resource pairs A3, B3, C3 and D3 form another 8-port NZP CSI-RS resource. 8-port NZP CSI-RS resources 0 and 3, for example, may be aggregated to form a 16-port NZP CSI-RS resource. The length 2 OCC is applied across two resource elements with the same sub-carrier index and adjacent OFDM symbol indices (e.g., OCC 2 is applied to the resource elements with OFDM symbol indices 2-3 and sub-carrier index 7 in slot 1).

For the OCC length 2 case (i.e., when higher layer parameter 'cdmType' is set to cdm2 or when 'cdmType' is not configured by Evolved Universal Terrestrial Access Network (EUTRAN)—see 3GPP TS 36.331 for further details), the mapping of the reference signal sequence $r_{l,n_s}(m)$ of Equation 2 to the complex-valued modulation symbols $a_{k,l}^{(p)}$ used as reference symbols on antenna port p is defined as:

$$a_{k,l}^{(p')} = w_{l''} \cdot r_{l,n_s}(m') \qquad \text{Equation 3}$$

where $$k = \qquad \text{Equation 4}$$

$$k' + 12m + \begin{cases} -0 & \text{for } p' \in \{15, 16\}, \text{ normal cyclic prefix} \\ -6 & \text{for } p' \in \{17, 18\}, \text{ normal cyclic prefix} \\ -1 & \text{for } p' \in \{19, 20\}, \text{ normal cyclic prefix} \\ -7 & \text{for } p' \in \{21, 22\}, \text{ normal cyclic prefix} \\ -0 & \text{for } p' \in \{15, 16\}, \text{ extended cyclic prefix} \\ -3 & \text{for } p' \in \{17, 18\}, \text{ extended cyclic prefix} \\ -6 & \text{for } p' \in \{19, 20\}, \text{ extended cyclic prefix} \\ -9 & \text{for } p' \in \{21, 22\}, \text{ extended cyclic prefix} \end{cases}$$

$$l = l' + \begin{cases} l'' & \text{CSI reference signal configurations } 0-19, \\ & \text{normal cyclic prefix} \\ 2l'' & \text{CSI reference signal configurations } 20-31, \\ & \text{normal cyclic prefix} \\ l'' & \text{CSI reference signal configurations } 0-27, \\ & \text{extended cyclic prefix} \end{cases}$$

$$w_{l''} = \begin{cases} 1 & p' \in \{15, 17, 19, 21\} \\ (-1)^{l''} & p' \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equations 3 and 4, $N_{RB}^{DL}$ represents the downlink transmission bandwidth; the indices k' and l' indicate the subcarrier index (starting from the bottom of each PRB) and the OFDM symbol index (starting from the right of each slot). The mapping of different (k', l') pairs to different CSI-RS resource configurations is given in Table 1. The quantity p' for the case of OCC length 2 is related to the antenna port number p as follows:

p=p' for CSI-RS using up to 8 antenna ports when higher-layer parameter 'cdmType' is set to cdm2 for CSI-RS using more than 8 antenna ports, then $$p = \begin{cases} p' + \dfrac{N_{ports}^{CSI}}{2} i & \text{for } p' \in \{15, \ldots, 15 + N_{ports}^{CSI}/2 - 1\} \\ p' + \dfrac{N_{ports}^{CSI}}{2}(i + N_{res}^{CSI} - 1) & \text{for } p' \in \{15 + N_{ports}^{CSI}/2, \ldots, 15 + N_{ports}^{CSI} - 1\} \end{cases} \qquad \text{Equation 5}$$

wherein $i \in \{0, 1, \ldots, N_{res}^{CSI} - 1\}$ is the CSI resource number; and $N_{res}^{CSI}$ and $N_{ports}^{CSI}$ respectively denote the number of aggregated CSI-RS resources and the number of antenna ports per aggregated CSI-RS resource. As described above, the allowed values of $N_{res}^{CSI}$ and $N_{ports}^{CSI}$ for the cases of 12 and 16 port NZP CSI-RS design are given in Table 2.

TABLE 1

Mapping from CSI reference signal configuration to (k', l') for normal cyclic prefix - taken from Table 6.10.5.2-1 of 3GPP TS 36.211.

| | Number of CSI reference signals configured | | | | | | | | | | | |
|---|---|---|---|---|---|---|---|---|---|---|---|---|
| | 1 or 2 | | | | 4 | | | | 8 | | | |
| CSI-RS config. | Normal subframe (k', l') | $n'_s$ | Special subframe (k', l') | $n'_s$ | Normal subframe (k', l') | $n'_s$ | Special subframe (k', l') | $n'_s$ | Normal subframe (k', l') | $n'_s$ | Special subframe (k', l') | $n'_s$ |
| 0  | (9, 5)  | 0 | (9, 5)  | 0 | (9, 5)  | 0 | (9, 5)  | 0 | (9, 5)  | 0 | (9, 5)  | 0 |
| 1  | (11, 2) | 1 | (11, 5) | 0 | (11, 2) | 1 | (11, 5) | 0 | (11, 2) | 1 | (11, 5) | 0 |
| 2  | (9, 2)  | 1 | (9, 2)  | 1 | (9, 2)  | 1 | (9, 2)  | 1 | (9, 2)  | 1 | (9, 2)  | 1 |
| 3  | (7, 2)  | 1 | (7, 5)  | 0 | (7, 2)  | 1 | (7, 5)  | 0 | (7, 2)  | 1 | (7, 5)  | 0 |
| 4  | (9, 5)  | 1 |         |   | (9, 5)  | 1 |         |   | (9, 5)  | 1 |         |   |
| 5  | (8, 5)  | 0 | (8, 5)  | 0 | (8, 5)  | 0 | (8, 5)  | 0 |         |   |         |   |
| 6  | (10, 2) | 1 | (10, 5) | 0 | (10, 2) | 1 | (10, 5) | 0 |         |   |         |   |
| 7  | (8, 2)  | 1 | (8, 2)  | 1 | (8, 2)  | 1 | (8, 2)  | 1 |         |   |         |   |
| 8  | (6, 2)  | 1 | (6, 5)  | 0 | (6, 2)  | 1 | (6, 5)  | 0 |         |   |         |   |
| 9  | (8, 5)  | 1 |         |   | (8, 5)  | 1 |         |   |         |   |         |   |
| 10 | (3, 5)  | 0 | (3, 5)  | 0 |         |   |         |   |         |   |         |   |
| 11 | (2, 5)  | 0 | (2, 5)  | 0 |         |   |         |   |         |   |         |   |
| 12 | (5, 2)  | 1 | (5, 5)  | 0 |         |   |         |   |         |   |         |   |
| 13 | (4, 2)  | 1 | (4, 5)  | 0 |         |   |         |   |         |   |         |   |
| 14 | (3, 2)  | 1 | (3, 2)  | 1 |         |   |         |   |         |   |         |   |
| 15 | (2, 2)  | 1 | (2, 2)  | 1 |         |   |         |   |         |   |         |   |
| 16 | (1, 2)  | 1 | (1, 5)  | 0 |         |   |         |   |         |   |         |   |
| 17 | (0, 2)  | 1 | (0, 5)  | 0 |         |   |         |   |         |   |         |   |
| 18 | (3, 5)  | 1 |         |   |         |   |         |   |         |   |         |   |
| 19 | (2, 5)  | 1 |         |   |         |   |         |   |         |   |         |   |
| 20 | (11, 1) | 1 |         |   | (11, 1) | 1 |         |   | (11, 1) | 1 |         |   |
| 21 | (9, 1)  | 1 |         |   | (9, 1)  | 1 |         |   | (9, 1)  | 1 |         |   |
| 22 | (7, 1)  | 1 |         |   | (7, 1)  | 1 |         |   | (7, 1)  | 1 |         |   |
| 23 | (10, 1) | 1 |         |   | (10, 1) | 1 |         |   |         |   |         |   |
| 24 | (8, 1)  | 1 |         |   | (8, 1)  | 1 |         |   |         |   |         |   |
| 25 | (6, 1)  | 1 |         |   | (6, 1)  | 1 |         |   |         |   |         |   |
| 26 | (5, 1)  | 1 |         |   |         |   |         |   |         |   |         |   |
| 27 | (4, 1)  | 1 |         |   |         |   |         |   |         |   |         |   |
| 28 | (3, 1)  | 1 |         |   |         |   |         |   |         |   |         |   |
| 29 | (2, 1)  | 1 |         |   |         |   |         |   |         |   |         |   |
| 30 | (1, 1)  | 1 |         |   |         |   |         |   |         |   |         |   |
| 31 | (0, 1)  | 1 |         |   |         |   |         |   |         |   |         |   |

Note:
$n'_s = n_s \mod 2$. Configurations 0-19 for normal subframes are available for frame structure types 1, 2 and 3. Configurations 20-31 and configurations for special subframes are available for frame structure type 2 only.

TABLE 2

Aggregation of CSI-RS resources - taken from Table 6.10.5-1 of 3GPP TS 36.211.

| Total number of antenna ports $N_{res}^{CSI} N_{ports}^{CSI}$ | Number of antenna ports per resources $N_{ports}^{CSI}$ | Number of CSI-RS resources $N_{res}^{CSI}$ |
|---|---|---|
| 12 | 4 | 3 |
| 16 | 8 | 2 |

FIG. 9 illustrates a resource element grid with an example NZP CSI-RS design for 12 ports with OCC length 4. The different 4-port NZP CSI-RS resources are denoted by the letters A-J. For example, 4-port resources A, F, and J could be aggregated to form a 12-port NZP CSI-RS resource. A length 4 OCC is applied within a CDM group where a CDM group consists of the 4 resource elements used for mapping legacy 4-port CSI-RS. That is, the resource elements labeled with the same letter comprise one CDM group.

FIG. 10 illustrates a resource element grid with an example NZP CSI-RS design for 16 ports with OCC length 4. The different 8-port NZP CSI-RS resources are indicated by number (e.g., 0-4). The resource pairs that comprise the 8-port resource are indicated by letter (e.g., A-B). For example, the resource pairs labelled A0 and B0 form one 8-port NZP CSI-RS resource. The resource pairs labelled A3 and B3 form another 8-port NZP CSI-RS resource. 8-port NZP CSI-RS resources 0 and 3, for example, may be aggregated to form a 16-port NZP CSI-RS resource. A and B are the CDM groups within each 8-port resource. An OCC with length 4 is applied within each CDM group.

For the OCC length 4 case (i.e., when higher layer parameter 'cdmType' is set to cdm4—see 3GPP TS 36.331 for further details), the mapping of the reference signal sequence $r_{l,n_s}(m)$ of Equation 2 to the complex-valued modulation symbols $a_{k,l}^{(p)}$ used as reference symbols on antenna port p are defined as:

$$a_{k,l}^{(p')} = w_{p'}(i) \cdot r_{l,n_s}(m') \qquad \text{Equation 6}$$

where $$k = k' + 12m - \begin{cases} k'' & \text{for } p' \in \{15, 16, 19, 20\}, \\ & \text{normal cyclic prefix, } N_{ports}^{CSI} = 8 \\ k'' + 6 & \text{for } p' \in \{17, 18, 21, 22\}, \\ & \text{normal cyclic prefix, } N_{ports}^{CSI} = 8 \\ 6k'' & \text{for } p' \in \{15, 16, 17, 18\}, \\ & \text{normal cyclic prefix, } N_{ports}^{CSI} = 4 \end{cases} \qquad \text{Equation 7}$$

-continued $$l = l' + \begin{cases} l'' & \text{CSI reference signal configurations } 0-19, \\ & \text{normal cyclic prefix} \\ 2l'' & \text{CSI reference signal configurations } 20-31, \\ & \text{normal cyclic prefix} \end{cases}$$

$$l'' = 0, 1$$

$$k'' = 0, 1$$

$$i = 2k'' + l''$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equations 6 and 7, $N_{RB}^{DL}$ represents the downlink transmission bandwidth; $N_{ports}^{CSI}$ denotes the number of antenna ports per aggregated CSI-RS resource; the indices k' and l' indicate the subcarrier index (starting from the bottom of each RB) and the OFDM symbol index (starting from the right of each slot). The mapping of different (k', l') pairs to different CSI-RS resource configurations is given in Table 1. Furthermore, $w_{p'}(i)$ in Equation 6 is given by Table 3. When higher-layer parameter 'cdmType' is set to cdm4 for CSI-RS using more than 8 antenna ports, antenna port number:

$$p = i' N_{ports}^{CSI} + p'  \qquad \text{Equation 8}$$

where p'∈{15, 16, . . . , $+N_{ports}^{CSI}-1$} for CSI-RS resource number i'∈{0, 1, . . . , $N_{res}^{CSI}-1$}.

TABLE 3

The sequence $w_{p'}(i)$ for CDM4 - taken
from Table 6.10.5.2-0 of 3GPP TS 36.211

| | p' | |
|---|---|---|
| $N_{ports}^{CSI} = 4$ | $N_{ports}^{CSI} = 8$ | [$w_{p'}(0)$ $w_{p'}(1)$ $w_{p'}(2)$ $w_{p'}(3)$] |
| 15 | 15, 17 | [1 1 1 1] |
| 16 | 16, 18 | [1 −1 1 −1] |
| 17 | 19, 21 | [1 1 −1 −1] |
| 18 | 20, 22 | [1 −1 −1 1] |

The number of different 12-port and 16-port CSI-RS configurations in a subframe in the LTE Release 13 NZP CSI-RS designs are three and two, respectively. That is, for the 12 port case, three different CSI-RS configurations can be formed where each configuration is formed by aggregating three legacy 4-port CSI-RS configurations. This consumes 36 CSI-RS resource elements of the 40 CSI-RS resource elements available for CSI-RS within a PRB. For the 16 port case, two different CSI-RS configurations can be formed where each configuration is formed by aggregating two legacy 8-port CSI-RS configurations. This consumes 32 CSI-RS resource elements of the 40 CSI-RS resource elements available for CSI-RS within a PRB.

In LTE, CSI-RS may be transmitted periodically on certain subframes, referred to as CSI-RS subframes. In $N_R$, CSI-RS may be transmitted on certain slots (i.e., CSI-RS slots). The term CSI-RS subframes may be used interchangeably to refer to CSI-RS subframes or slots. CSI-RS subframe/slot configuration consists of a subframe/slot periodicity and a subframe/slot offset. In LTE, the periodicity is configurable at 5, 10, 20, 40 and 80 ms.

A CSI-RS configuration consists of a CSI-RS resource configuration and a CSI-RS subframe configuration. A UE can be configured with up to three CSI-RS configurations for CSI feedback.

To improve CSI-RS channel estimation, an eNB may not transmit any signals in certain CSI-RS REs, referred as zero-power CSI-RS or ZP CSI-RS. The CSI-RS used for CSI estimation is also referred to as non-zero power CSI-RS or NZP CSI-RS. When the ZP CSI-RS REs in a first transmission (on a first cell, a first beam, and/or intended for a first UE) coincide with NZP CSI-RS REs in a second transmission (on a second cell, a second beam, and/or intended for a second UE), the first transmission does not interfere with the NZP CSI-RS in the second transmission. By avoiding interference in this way, the CSI-RS channel estimation for a cell, beam, and/or a UE can be improved.

When a physical channel or signal is transmitted in distinct, orthogonal resources K times, this is termed a reuse factor of K. A reuse factor of K cells for CSI-RS means that K non-overlapping (that is, not occupying the same REs if they occupy the same subframes) CSI-RS resources are configured or reserved in each cell and one of the K resources is used by each cell.

FIG. 11 illustrates an example of reuse factor K=3 for CSI-RS. More particularly, FIG. 11 shows an example of reuse factor K=3 for CSI-RS, where 3 CSI-RS resources are configured in each cell but only one CSI-RS resource is configured for NZP CSI-RS and the other two resources are configured as ZP CSI-RS.

The NZP CSI-RS in different cells are non-overlapping. For example, if 21 of the 40 REs available for CSI-RS in a subframe are used for NZP CSI-RS by one cell, the remaining 19 CSI-RS REs are not enough for configuring a 20-port NZP CSI-RS in another cell. Thus, only one cell can transmit more than 20 NZP CSI-RS in a subframe without CSI-RS collision with other cells' CSI-RS. Therefore, to achieve a K>1 reuse factor with more than 20 ports, cells must transmit their CSI-RS in different subframes. As discussed below, Rel-13 UEs can generally only be configured to receive ZP CSI-RS in one subframe out of $T_{CSI-RS}$ subframes.

Only CSI-RS REs for 4 antenna ports can be allocated to ZP CSI-RS. A ZP CSI-RS subframe configuration is associated with ZP CSI-RS. It can be the same as or different from a NZP CSI-RS configuration.

The subframe configuration period $T_{CSI-RS}$ and the subframe offset $\Delta_{CSI-RS}$ for the occurrence of CSI reference signals are listed in Table 6.10.5.3-1 of 3GPP TS 36.211 (shown as Table 4 below). The parameter $I_{CSI-RS}$ in Table 4 can be configured separately for CSI reference signals for which the UE shall assume non-zero and zero transmission power.

TABLE 4

CSI reference signal subframe configuration (Taken
from Table 6.10.5.3-1 of 3GPP TS 36.211)

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

In general, a full dimension MIMO (FD-MIMO) UE (one configured for Class A or Class B CSI reporting) can only be configured with one ZP CSI-RS configuration. UEs that support discovery signal reception or reception using two subframe sets can support more than one ZP CSI-RS configuration. FD-MIMO UEs are not required to support these features.

Because FD-MIMO UEs only support up to 16 CSI-RS ports in Rel-13, a reuse factor of up to 2 can be supported while using ZP CSI-RS to protect NZP CSI-RS, because two sets of 16 ports can fit in one subframe, as described above. However, Rel-14 may include up to 32 ports, and because only one ZP CSI-RS can be configured for certain FD-MIMO UEs in Rel-13, Rel-13 mechanisms that protect more than one NZP CSI-RS with a ZP CSI-RS in different subframes are not available. Thus, reuse patterns >2 are not possible for these UEs with 32 ports.

TM10 includes a concept referred to as a CSI process (see 3GPP TS 36.213). A CSI process is associated with a NZP CSI-RS resource and a CSI interference measurement (CSI-IM) resource. A CSI-IM resource is defined by a ZP CSI-RS resource and a ZP CSI-RS subframe configuration. A UE can be configured with up to 3 CSI-RS processes. Multiple CSI processes are used to support Coordinated Multi-Point (COMP) transmission in which a UE measures and feeds back CSI associated with each transmission point (TP) to an eNB. Based on the received CSIs, the eNB may decide to transmit data to the UE from one of the TPs.

In Rel-13, a CSI-IM is always associated with an NZP CSI-RS resource in a one-to-one fashion, such that the number of CSI-IMs is equal to the number of NZP CSI-RS resources. Therefore, while a CSI-IM is constructed from a ZP CSI-RS resource, it is not suitable for preventing interference to other NZP CSI-RS, and so is not useful to increase CSI-RS reuse factors.

Measurement restriction is included in LTE Release 13 for TM9 and TM10. CSI measurement may be restricted to a CSI-RS resource or a CSI-IM resource in one subframe.

For a UE in TM9 or TM10 and for a CSI process, if the UE is configured with parameter CSI-Reporting-Type by higher layers, and CSI-Reporting-Type is set to 'CLASS B', and parameter channelMeasRestriction is configured by higher layers, the UE shall derive the channel measurements for computing the CQI value reported in uplink subframe n and corresponding to the CSI process, based on only the most recent, no later than the CSI reference resource, non-zero power CSI-RS within a configured CSI-RS resource associated with the CSI process.

For a UE in TM10 and for a CSI process, when parameters CSI-Reporting-Type and interferenceMeasRestrlction is configured by higher layers, the UE shall derive the interference measurements for computing the CQI value reported in uplink subframe n and corresponding to the CSI process, based on only the most recent, no later than the CSI reference resource, configured CSI-IM resource associated with the CSI process.

Channel measurement restriction to one CSI-RS subframe is needed in Class B in which the precoding for CSI-RS may be different in different CSI-RS subframes.

In LTE Rel-14, up to 32 antenna ports may be supported in the downlink. However, a maximum of 40 CSI-RS REs are available per PRB in a CSI-RS subframe. Thus, only one 32 port CSI-RS configuration can be supported per CSI-RS subframe. How to reduce CSI-RS overhead and mechanisms on how to increase the number to allow higher number of CSI-RS configurations with 32 ports is discussed in 3GPP TSG-RAN R1-163079, "CSI-RS Design for Class A eFD-MIMO." Measurement restriction (MR) in frequency domain described in R1-163079 is one technique that may achieve these goals.

Although the general concept of MR in frequency domain is described in R1-163079, some details of this technique are still missing. For example, one problem is that when the measurement restriction is configured, how the UE interprets resource element to port mapping is not clearly defined.

As shown in Table 4 above, ZP CSI-RS for a serving cell can only be configured with a single CSI-RS-SubframeConfig parameter if a UE only supports one ZP CSI-RS configuration. This means that the ZP CSI-RS can only happen in one given subframe configuration. However, with increasing number of CSI-RS ports being available in LTE Release 14, achieving reuse factors higher than 1 for CSI-RS within a single subframe is not possible for large numbers of CSI-RS ports, such as 32 CSI-RS ports.

SUMMARY

The embodiments described herein include resource element (RE) to port mapping for measurement restriction (MR) in frequency domain (FD). Particular embodiments include a port mapping scheme for the case where an eNB semi-statically configures a user equipment (UE) to measure all ports on a subset of physical resource blocks (PRBs). Some embodiments include various alternatives for how the MR_sets may be signaled.

Particular embodiments include a port mapping scheme for the case where a UE is semi-statically configured to measure channels on a subset of CSI-RS ports on one set of PRBs and another subset of antenna ports on a different set of PRBs. Various alternatives for how the MR sets and CSI-RS resource sets which contain subset of ports are described. Particular embodiments describe how RE to port mapping is performed using the RRC configured MR_set and/or CSI-RS Resource set parameters in a configurable manner.

Some embodiments include multiple ZP CSI-RS subframe configurations. For example, particular embodiments include configuring multiple ZP CSI-RS subframe configurations to enable higher reuse factors.

According to some embodiments, a method for use in a network node of transmitting channel state information reference signals (CSI-RS) comprises transmitting, to a wireless device, an indication of a subset of physical resource blocks (PRBs) that the wireless device should use to measure CSI-RS. Each CSI-RS is associated with an antenna port. The subset of PRBs comprises a subset of the system bandwidth. The method further comprises transmitting CSI-RS on the indicated subset of PRBs.

The method may further comprise, prior to transmitting the indication, obtaining, by the network node, the indication of the subset of physical resource blocks (PRBs) that the wireless device should use to measure CSI-RS.

In particular embodiments, the network node transmits CSI-RS on a total number of antenna ports (e.g., greater than 16), and each PRB of the subset of PRBs includes a CSI-RS mapping for the total number of antenna ports.

In particular embodiments, the subset of PRBs that the wireless device should use to measure CSI-RS comprises even numbered PRBs or odd numbered PRBs. The indication of the subset of PRBs that the wireless device should use to measure CSI-RS may comprise a density value and a comb offset.

For example, the density value may comprise a density of ½. A first comb offset indicates that the wireless device should use the PRBs in, or rather identified by, a set m1 to measure CSI-RS, wherein the set m1 comprises {0, 2, ..., $N_{RB}^{DL}-2\}$. A second comb offset indicates that the wireless device should use the PRBs in, or rather identified by, a set m2 to measure CSI-RS, wherein the set m2 comprises $\{1, 3, \ldots, N_{RB}^{DL}-1\}$.

As another example, the density value may comprise a density of ⅓. A first comb offset indicates that the wireless device should use the PRBs in, or rather identified by, a set m1 to measure CSI-RS, wherein the set m1 comprises $\{0, 3, \ldots, N_{RB}^{DL}-3\}$. A second comb offset indicates that the wireless device should use the PRBs in, or rather identified by, a set m2 to measure CSI-RS, wherein the set m2 comprises $\{1, 4, \ldots, N_{RB}^{DL}-2\}$. A third comb offset indicates that the wireless device should use the PRBs in, or rather identified by, a set m3 to measure CSI-RS, wherein the set m3 comprises $\{2, 5, \ldots, N_{RB}^{DL}-1\}$.

The indication of the subset of PRBs that the wireless device should use to measure CSI-RS ports may comprise an index value k. The index value k refers to one of a plurality of indications stored at the wireless device.

In particular embodiments, the indication of the subset of PRBs that the wireless device should use to measure CSI-RS ports further comprises a number of successive CSI-RS subframes/slots in which the wireless device should measure CSI-RS.

The method may further comprise receiving, from the wireless device, a channel state information (CSI) determined based on measurements of one or more of the transmitted CSI-RS.

According to some embodiments, a method for use in a wireless device of receiving CSI-RS comprises receiving an indication of a subset of PRBs that the wireless device should use to measure CSI-RS. Each of the CSI-RS is associated with an antenna port. The subset of PRBs comprises a subset of the system bandwidth. The method further comprises receiving CSI-RS on the indicated subset of PRBs. The method may further comprise determining a CSI based on the received CSI-RS and transmitting the CSI to a network node.

In particular embodiments, a network node transmits CSI-RS on a total number of antenna ports (e.g., greater than 16), and each PRB of the subset of PRBs includes a CSI-RS mapping for the total number of antenna ports.

In particular embodiments, the subset of PRBs that the wireless device should use to measure CSI-RS comprises even numbered PRBs or odd numbered PRBs. The indication of the subset of PRBs that the wireless device should use to measure CSI-RS ports may comprise a density value and a comb offset.

For example, the density value may comprise a density of ½. A first comb offset indicates that the wireless device should use the PRBs in, or rather identified by, a set m1 to measure CSI-RS, wherein the set m1 comprises $\{0, 2, \ldots, N_{RB}^{DL}-2\}$. A second comb offset indicates that the wireless device should use the PRBs in, or rather identified by, a set m2 to measure CSI-RS, wherein the set m2 comprises $\{1, 3, \ldots, N_{RB}^{DL}-1\}$.

As another example, the density value may comprise a density of ⅓. A first comb offset indicates that the wireless device should use the PRBs in, or rather identified by, a set m1 to measure CSI-RS, wherein the set m1 comprises $\{0, 3, \ldots, N_{RB}^{DL}-3\}$. A second comb offset indicates that the wireless device should use the PRBs in, or rather identified by, a set m2 to measure CSI-RS, wherein the set m2 comprises $\{1, 4, \ldots, N_{RB}^{DL}-2\}$. A third comb offset indicates that the wireless device should use the PRBs in, or rather identified by, a set m3 to measure CSI-RS, wherein the set m3 comprises $\{2, 5, \ldots, N_{RB}^{DL}-1\}$.

The indication of the subset of PRBs that the wireless device should use to measure CSI-RS ports may comprise an index value k. The index value k refers to one of a plurality of indications stored at the wireless device.

In particular embodiments, the indication of the subset of PRBs that the wireless device should use to measure CSI-RS ports further comprises a number of successive CSI-RS subframes/slots in which the wireless device should measure CSI-RS.

In particular embodiments, the method further comprises determining a CSI based on the received CSI-RS over the number of successive CSI-RS subframes/slots.

According to some embodiments, a network node operable to transmit CSI-RS comprises processing circuitry. The processing circuitry is operable to transmit, to a wireless device, an indication of a subset of PRBs that the wireless device should use to measure CSI-RS. Each CSI-RS is associated with an antenna port. The subset of PRBs comprises a subset of the system bandwidth. The processing circuitry is further operable to transmit CSI-RS on the indicated subset of PRBs.

The processing circuitry may further be operable to, prior to transmitting the indication, obtain the indication of the subset of physical resource blocks (PRBs) that the wireless device should use to measure CSI-RS.

According to some embodiments, a wireless device operable to receive CSI-RS comprises processing circuitry. The processing circuitry operable to receive an indication of a subset of PRBs that the wireless device should use to measure CSI-RS. Each CSI-RS is associated with an antenna port. The subset of PRBs comprises a subset of the system bandwidth. The processing circuitry is further operable to receive CSI-RS on the indicated subset of PRBs.

According to some embodiments, a network node operable to transmit CSI-RS comprises a transmitting module. The network node may further comprise an obtaining module. The obtaining module is operable to obtain an indication of a subset of PRBs that a wireless device should use to measure CSI-RS. The transmitting module is operable to: transmit, to the wireless device, the indication of the subset of PRBs that the wireless device should use to measure CSI-RS; and transmit CSI-RS on the indicated subset of PRBs.

According to some embodiments, a wireless device operable to receive CSI-RS comprises a receiving module. The receiving module is operable to: receive an indication of a subset of PRBs that the wireless device should use to measure CSI-RS; and receive CSI-RS on the indicated subset of PRBs.

Also disclosed is a computer program product. The computer program product comprises instructions stored on non-transient computer-readable media which, when executed by a processor, perform the acts of transmitting, to the wireless device, the indication of the subset of PRBs that the wireless device should use to measure CSI-RS; and transmitting CSI-RS on the indicated subset of PRBs. The computer program product may further comprise instructions stored on non-transient computer-readable media which, when executed by the processor, perform the acts of obtaining the indication of the subset of PRBs that the wireless device should use to measure CSI-RS.

Another computer program product comprises instructions stored on non-transient computer-readable media which, when executed by a processor, perform the acts of receiving an indication of a subset of PRBs that the wireless device should use to measure CSI-RS; and receiving CSI-RS on the indicated subset of PRBs.

Particular embodiments may exhibit some of the following technical advantages. As one example, certain embodiments may enable the measurement restriction in frequency domain technique by using efficient and flexible RE to port mapping schemes. As another example, certain embodiments may enable different CSI-RS ports to have different CSI-RS density in the frequency domain. As yet another example, certain embodiments may enable higher reuse factors for CSI-RS transmissions with a higher number of ports (e.g., 32 ports). Other technical advantages will be readily apparent to one skilled in the art from the following figures, description and claims.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Figure 1:
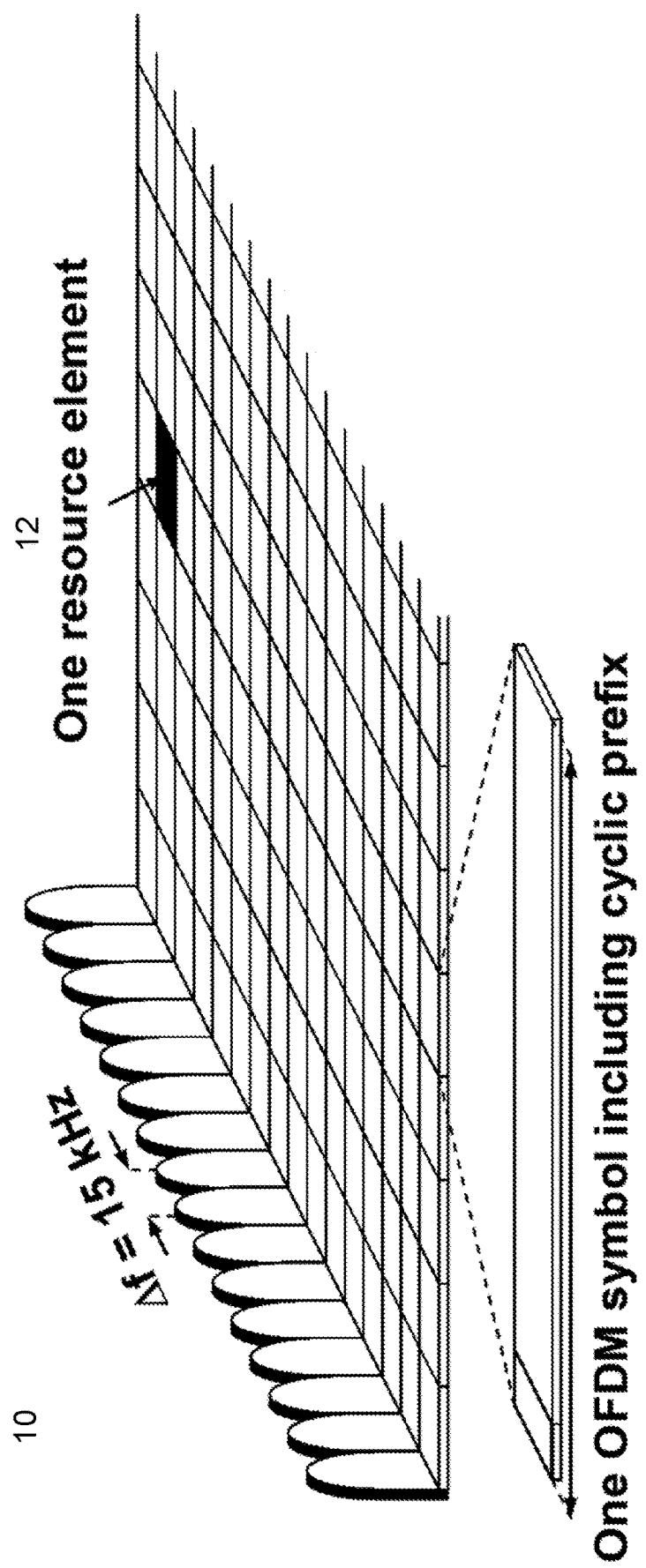
FIG. 1 illustrates an example downlink radio subframe.

Third Generation Partnership Project (3GPP) Long Term Evolution (LTE) uses Non-Zero Power Channel State Information Reference Symbols (NZP CSI-RS) as a flexible means to configure channel state information (CSI) feedback measurements. By measuring on a NZP CSI-RS, a user equipment (UE) can estimate the effective channel the NZP CSI-RS is traversing, including the radio propagation channel and antenna gains.

In LTE Rel-14, up to 32 antenna ports may be supported in the downlink. However, a maximum of 40 CSI-RS resource elements (REs) are available per physical resource block (PRB) in a CSI-RS subframe. Thus, only one 32 port CSI-RS configuration can be supported per CSI-RS subframe. Particular embodiments obviate the problems described above and may reduce CSI-RS overhead and facilitate a higher number of CSI-RS configurations with 32 ports.

In certain embodiments, methods are described for establishing a resource element to port mapping for measurement restriction in frequency domain. According to one example embodiment, a port mapping scheme is described for the case where an eNB semi-statically configures the UE to measure all ports on a subset of PRBs. Various alternatives for how the measurement restriction sets could be signaled are described. According to another example embodiment, a port mapping scheme is proposed for the case where a UE is semi-statically configured to measure channels on a subset of CSI-RS ports on one set of PRBs and another subset of antenna ports on a different set of PRBs. Various alternatives are described for how particular antenna ports are assigned to the measurement restriction sets and/or CSI-RS resource sets. In certain embodiments, solutions for how RE to port mapping may be performed using the RRC configured MR_set and/or CSI-RS resource set parameters in a configurable manner are described.

In certain embodiments, the network indicates to a UE if the UE can assume that a first PRB in a slot of a subframe contains a CSI-RS port transmission and that a second PRB in the slot of the subframe does not contain a CSI-RS port transmission, wherein the CSI-RS port is identified by a non-negative integer. In some cases, the first PRB may be identified with an index $m_1=Nk$, and the second PRB may be identified with $m_2=Nk+n$, where $n \in \{1, 2, \ldots, N-1\}$ and k is a non-negative integer. In some cases, the first PRB may be identified with an index $m_{\cdot 1}$ that is in a set M and the second PRB may be identified with an index $m_{\cdot 2}$ that is not in the set M, and wherein the network signals the set M to the UE.

PRBs included in various alternative subsets of PRBs as discussed herein may thus be identified by their respective PRB indices, and a set of such PRB indices may be used to define a subset of PRBs. The subset of PRBs is a smaller set as compared to a set of PRBs spanning the system bandwidth of the wireless network, e.g. an LTE system bandwidth or an NR system bandwidth. The subset of PRBs may include PRBs that are also included in the set of PRBs spanning the system bandwidth. As used herein, PRBs may sometimes be referred to as included in a set of indices (such as a set m1, m2 or m3 of indices), when strictly speaking, the PRB index identifying the PRB is included in the set of indices. This wording is merely used for simplicity and is not intended to be limiting.

In certain embodiments, methods are described for establishing multiple ZP CSI-RS subframe configurations. According to one example embodiment, a solution of configuring multiple ZP CSI-RS subframe configurations to enable higher reuse factors is described. As described in more detail below, in some cases a method of avoiding interference to NZP CSI-RS not intended for a UE comprises a network configuring a UE with one NZP CSI-RS resource, and a first and a second zero power (ZP) CSI-RS resource occurring in a first and a second subframe, wherein at least one of the first and second ZP CSI-RS resources has a periodicity of P subframes, and the first and second subframes are distinct within the period P.

In some cases, a method of avoiding interference to NZP CSI-RS not intended for a UE, comprises a network configuring a UE to receive one NZP CSI-RS and a first and a second zero power CSI-RS. The first zero power CSI-RS occurs in a first subframe and the second zero power CSI-RS occurs in a second subframe.

The various embodiments described herein may have one or more technical advantages. As one example, certain embodiments may enable the measurement restriction in frequency domain technique by proposing efficient/flexible RE to port mapping schemes. As another example, certain embodiments may enable higher reuse factors for CSI-RS transmissions with a higher number of ports (e.g., 32 ports).

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although terminology from 3GPP LTE is used herein to describe particular embodiments, the embodiments are not limited to only the aforementioned system. Other wireless systems, including New radio (NR), Wideband Code Division Multiple Access (WCDMA), Worldwide Interoperability for Microwave Access (WiMax), Ultra-Mobile Broadband (UMB) and Global System for Mobile Communication (GSM), etc. may also benefit from the embodiments described herein.

Terminology such as eNodeB and UE should be considered non-limiting and do not imply a particular hierarchical relation between the two. In NR the corresponding node to the eNodeB is referred to as a gNodeB. In general, "eNodeB" may be considered as a first device and "UE" as a second device. The two devices communicate with each other over a radio channel. While particular embodiments describe wireless transmissions in the downlink, other embodiments are equally applicable in the uplink.

Particular embodiments are described with reference to FIGS. 12-20B of the drawings, like numerals being used for like and corresponding parts of the various drawings. LTE is used throughout this disclosure as an example cellular system, but the ideas presented herein may apply to other wireless communication systems as well.

Figure 12:
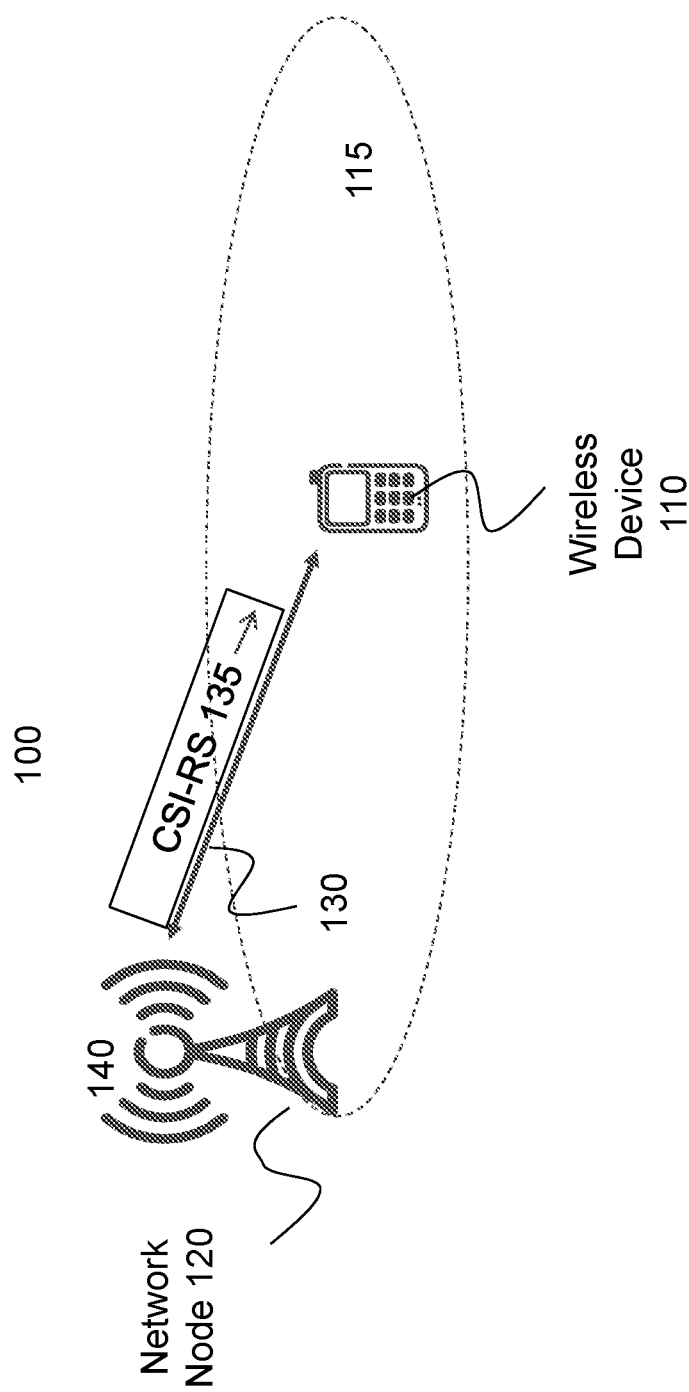
FIG. 12 is a block diagram illustrating an example wireless network, according to some embodiments.

FIG. 12 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a UE. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120).

Figure 2:
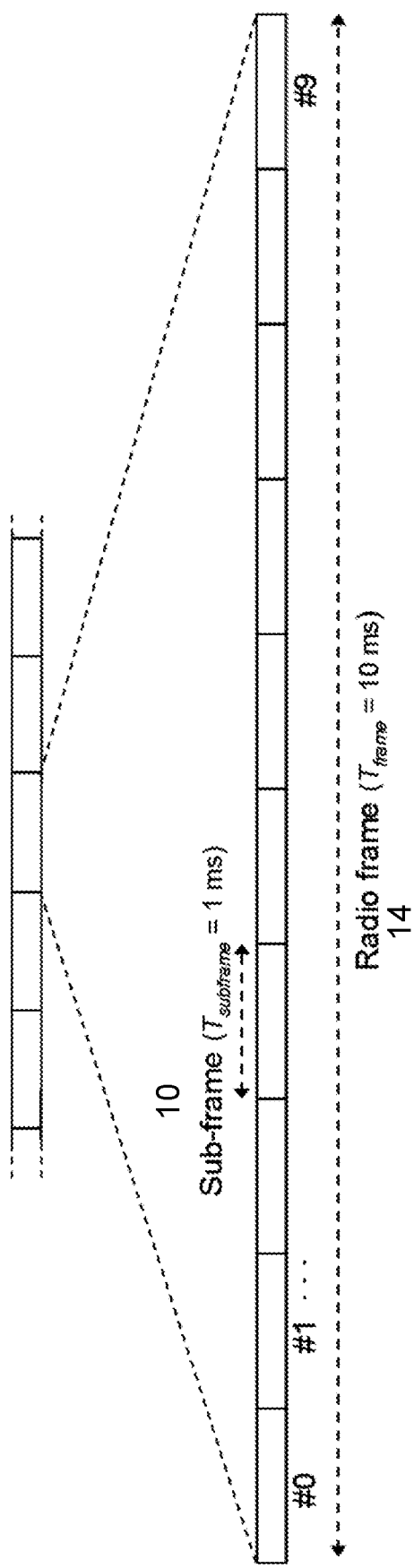
FIG. 2 illustrates an example radio frame.
Figure 3:
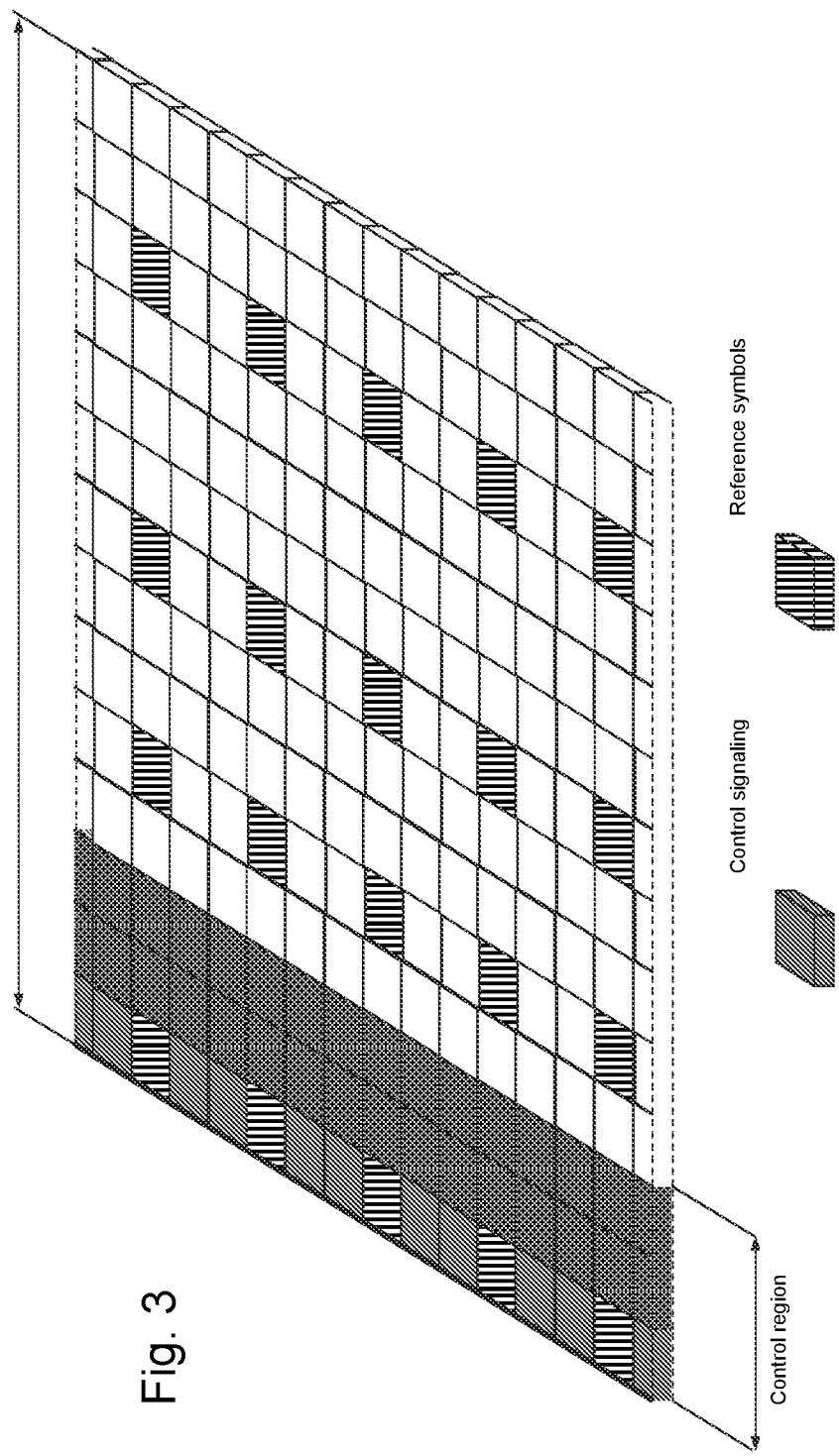
FIG. 3 illustrates an example downlink subframe.
Figure 4:
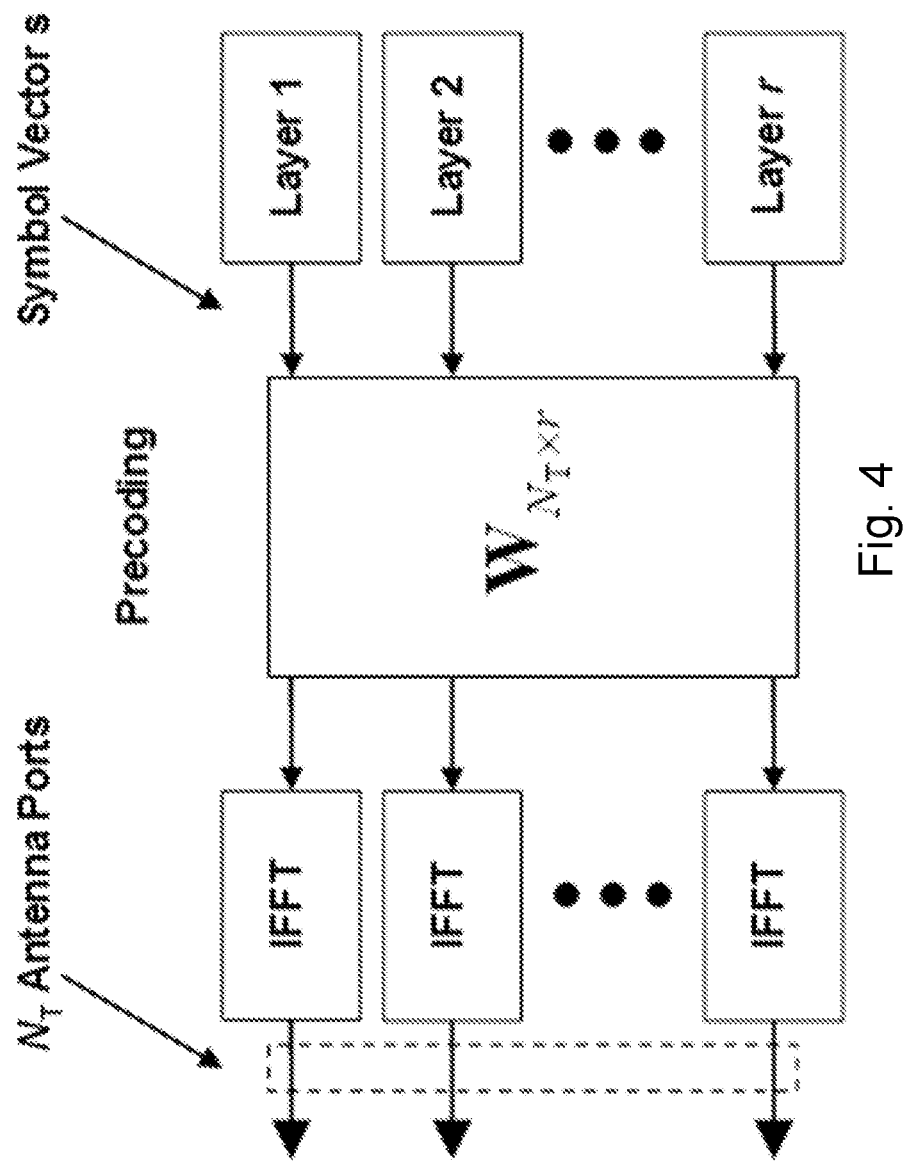
FIG. 4 is a block diagram illustrating the logical structure of precoded spatial multiplexing mode in LTE.
Figure 5:
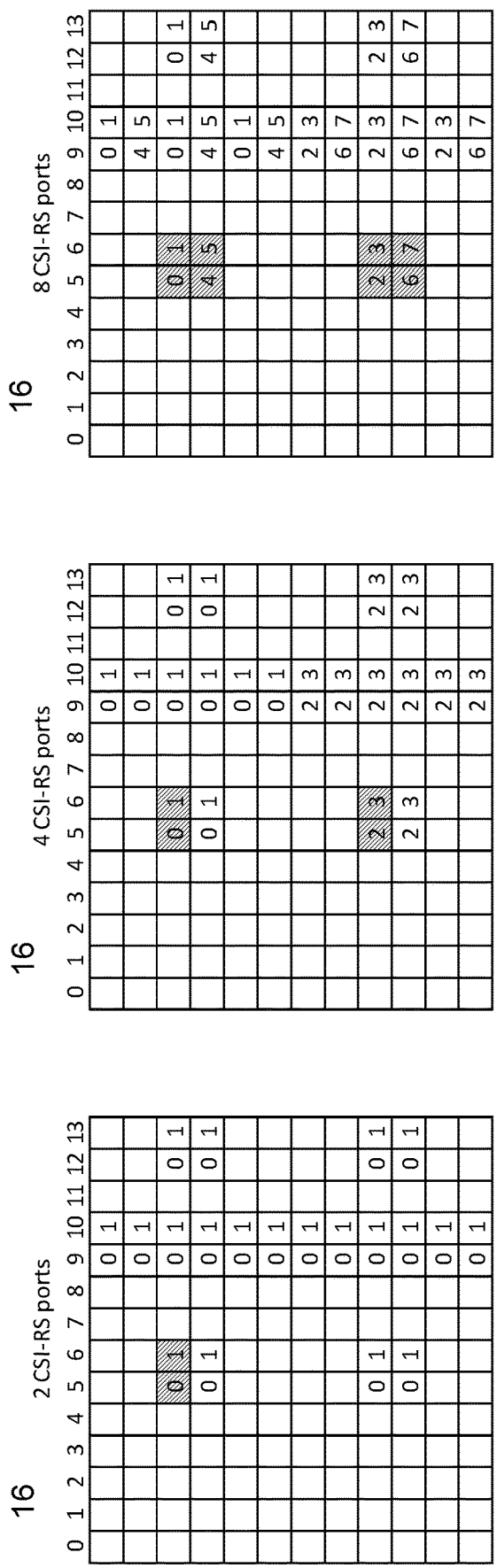
FIG. 5 illustrates resource element grids with resource block pairs showing potential positions for CSI-RS for 2, 4, and 8 antenna ports.
Figures 6A, 6B:
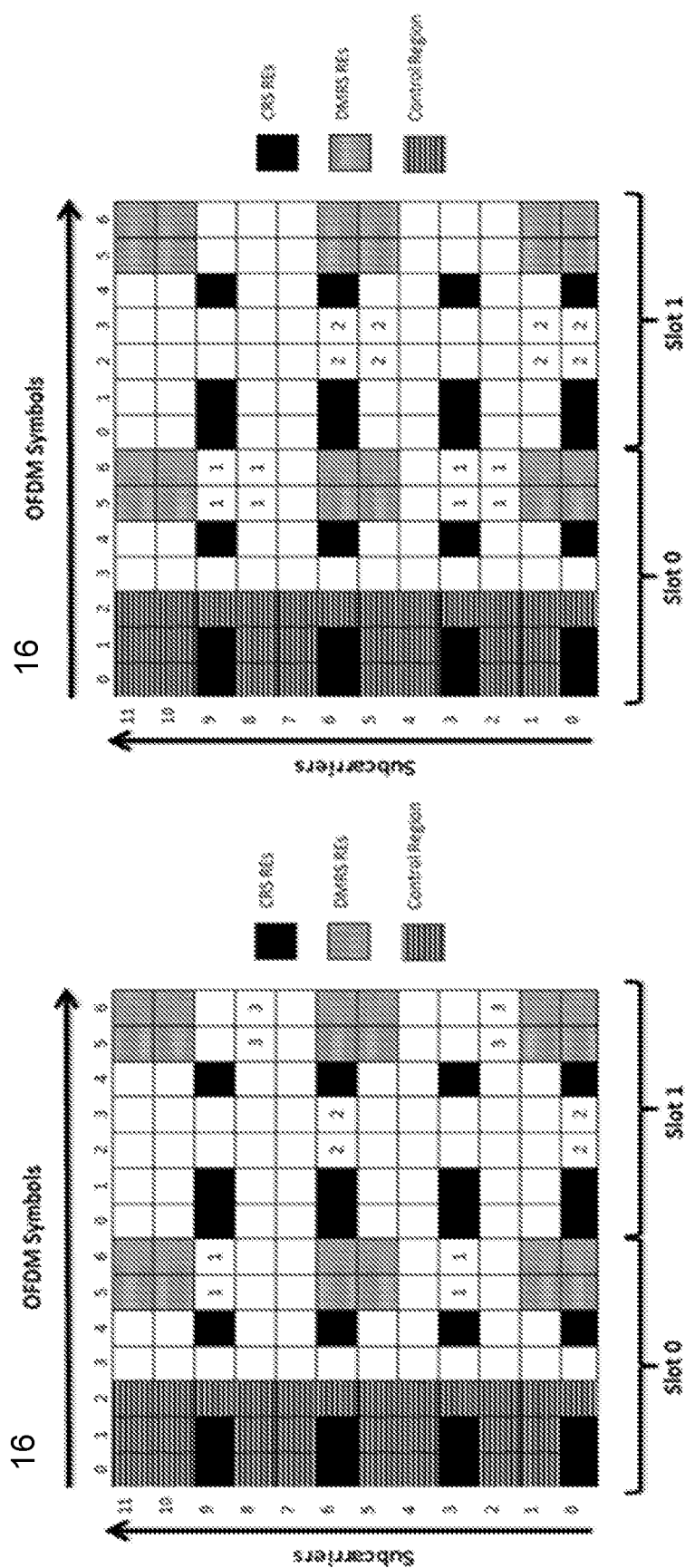
FIGS. 6A and 6B illustrate resource element grids with resource block pairs showing potential positions for CSI-RS for 12 and 16 antenna ports, respectively.
Figure 7:
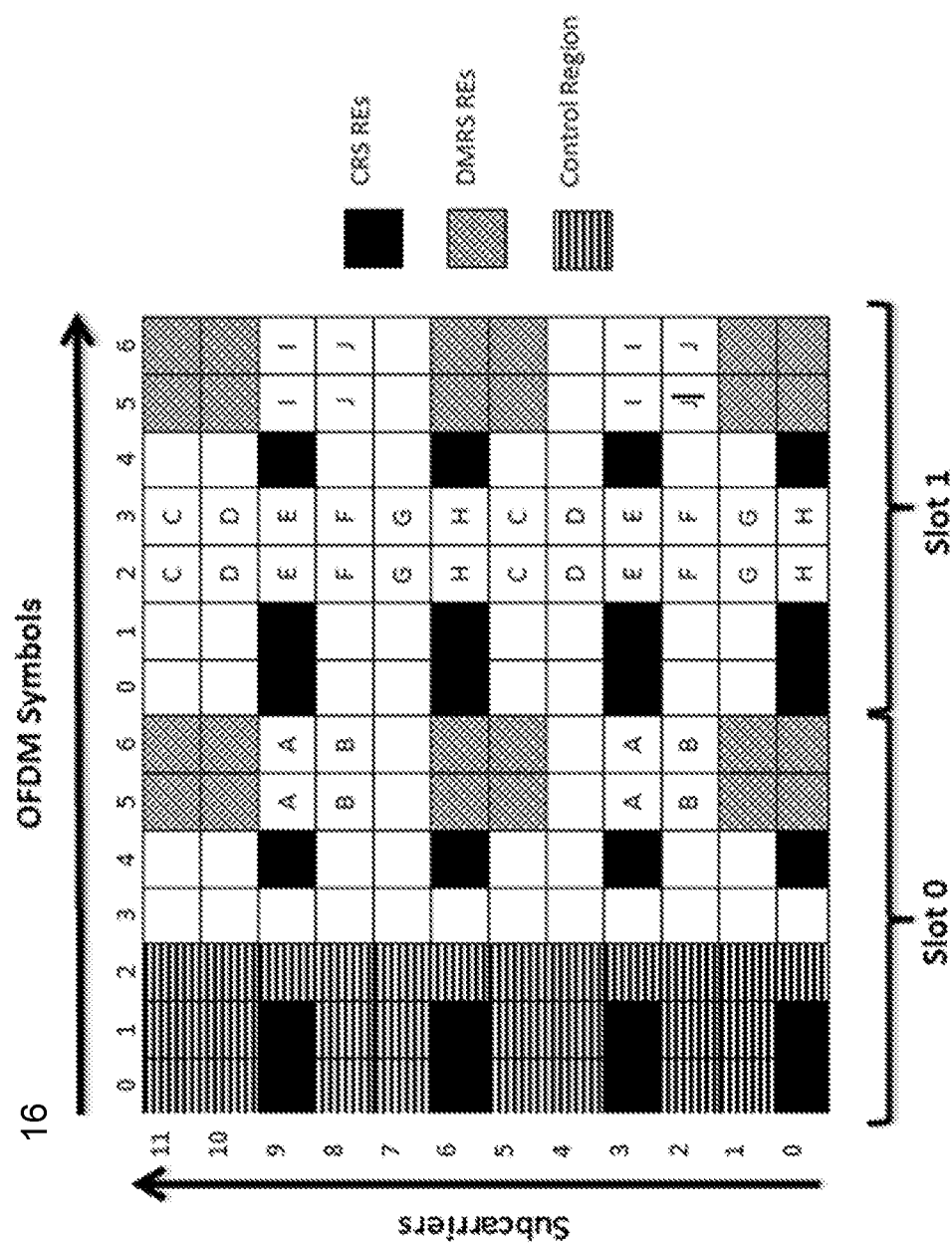
FIG. 7 illustrates a resource element grid with an example NZP CSI-RS design for 12 ports with OCC length 2.
Figure 8:
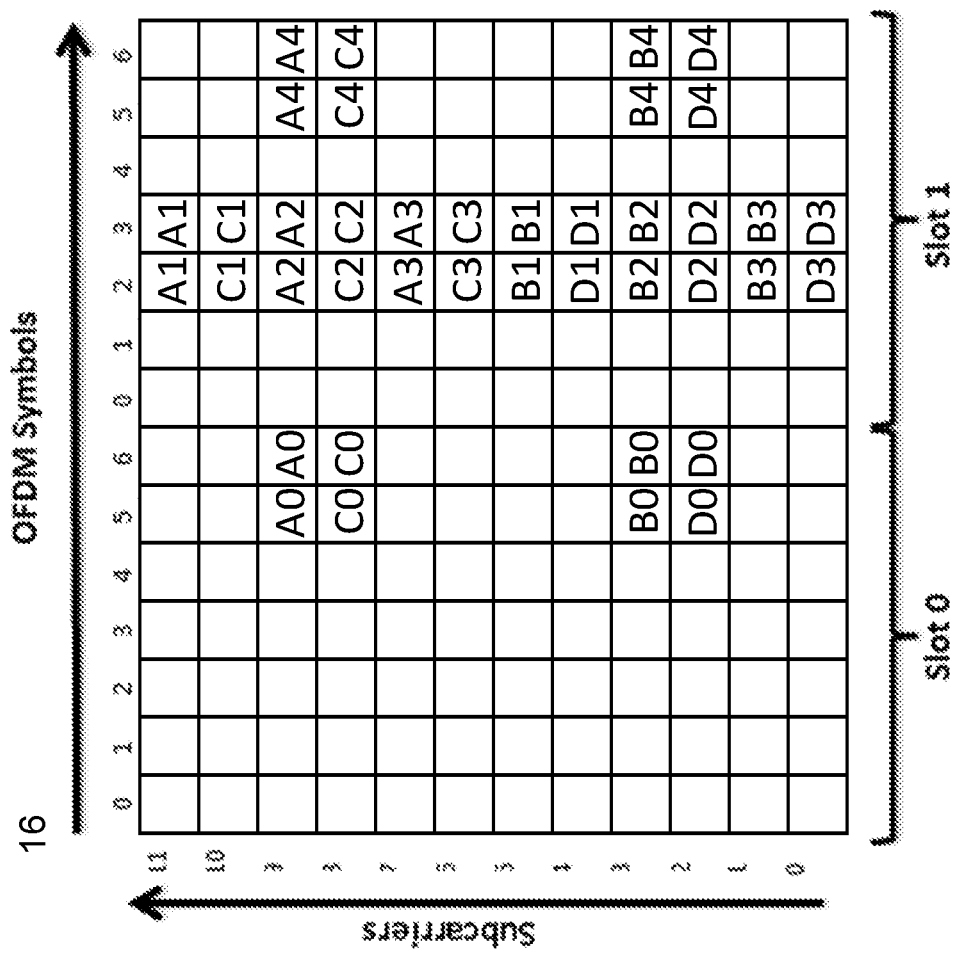
FIG. 8 illustrates a resource element grid with an example NZP CSI-RS design for 16 ports with OCC length 2.
Figure 9:
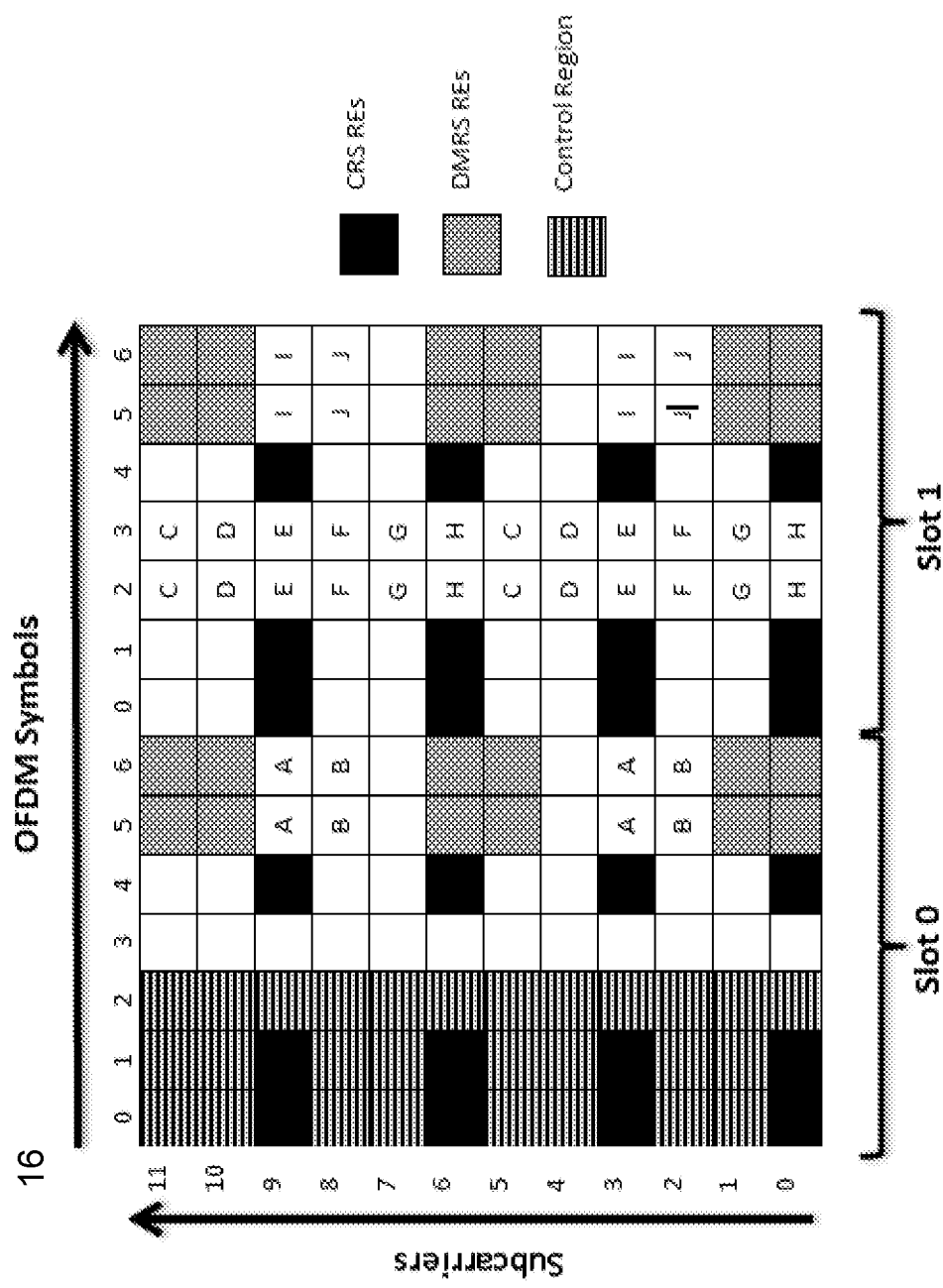
FIG. 9 illustrates a resource element grid with an example NZP CSI-RS design for 12 ports with OCC length 4.
Figure 10:
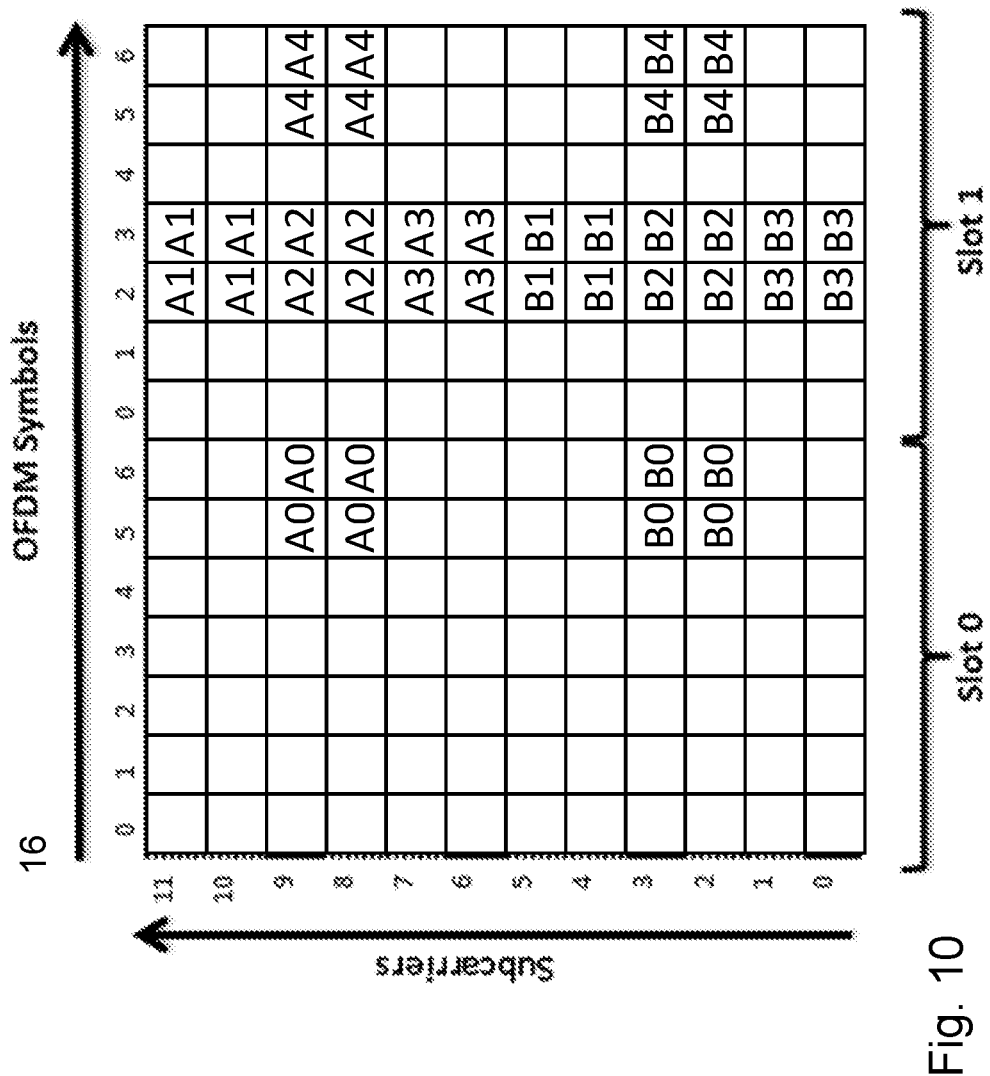
FIG. 10 illustrates a resource element grid with an example NZP CSI-RS design for 16 ports with OCC length 4.
Figure 11:
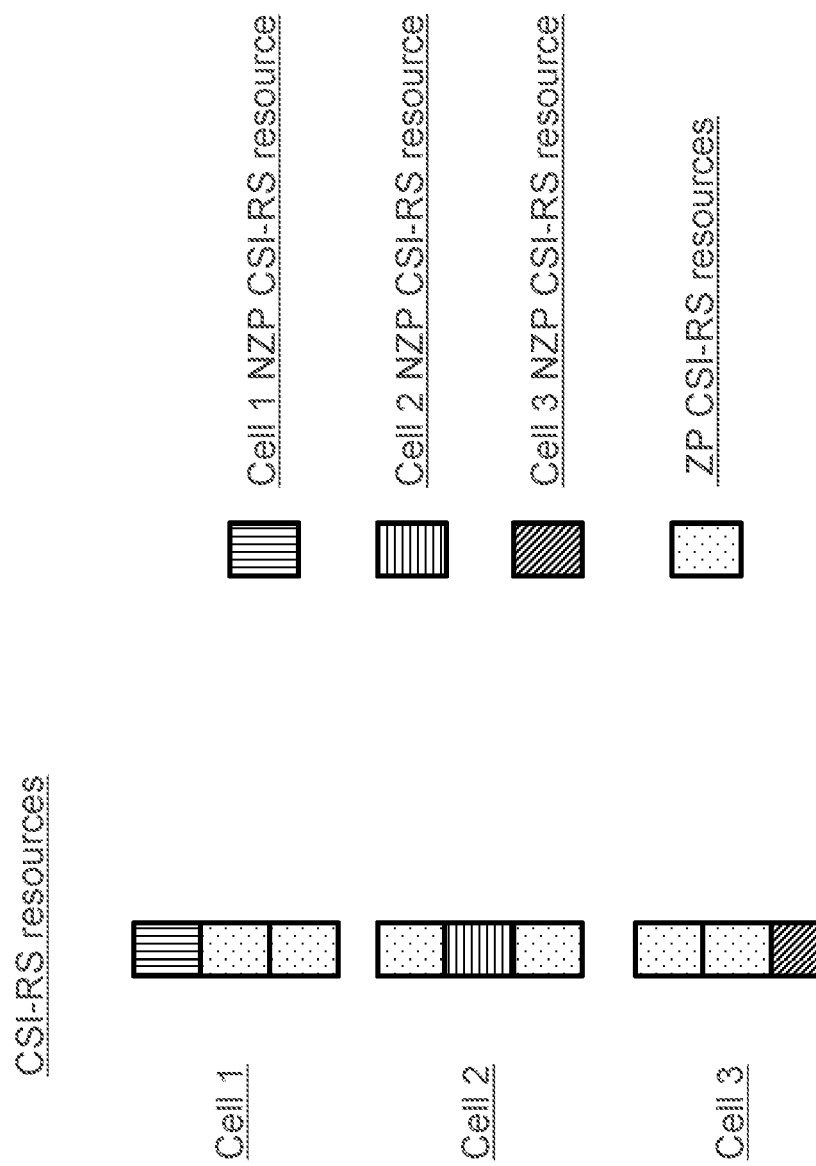
FIG. 11 illustrates an example of reuse factor K=3 for CSI-RS.

Network node 120 and wireless device 110 may communicate wireless signals 130 according to a radio frame and subframe structure similar to that described with respect to FIGS. 1-3. Other embodiments may include any suitable radio frame structure. For example, in NR the duration of the time symbols (such as OFDM symbols) may vary with the used numerology, and a subframe may thus not always contain the same number of symbols. Instead, the concept of "slots" may be used, a slot usually occupying 14 symbols, or occasionally 7 symbols, thus corresponding to an LTE subframe.

Each network node 120 may have a single transmitter 140 or multiple transmitters 140 for transmitting signals 130 to wireless devices 110. In some embodiments, network node 120 may comprise a multiple-input multiple-output (MIMO) system. Similarly, each wireless device 110 may have a single receiver or multiple receivers for receiving signals 130 from network nodes 120 or other wireless devices 110. The multiple transmitters of network node 120 may be associated with logical antenna ports.

Wireless signals 130 may include reference signals, such as CSI-RS reference signals 135. In particular embodiments, wireless signals 130 may include more than sixteen CSI-RS 135 in a subframe. Each CSI-RS 135 may be associated with an antenna port.

In particular embodiments, a network node, such as network node 120, transmits a number of CSI-RS 135 to one or more wireless devices, such as wireless device 110. In particular embodiments, the number of CSI-RS ports, i.e. ports upon which CSI-RS 135 are transmitted, is greater than 16. For example, the number of CSI-RS ports may be 32.

In particular embodiments, network node 120 may obtain an indication of a subset of PRBs that wireless device 110 should use to measure CSI-RS. Network node 120 may transmit, to wireless device 110, the indication of the subset of PRBs that the wireless device 110 should use to measure CSI-RS.

In particular embodiments, network node 120 may transmit the indication of PRBs to wireless device 110 as an indication of PRB indices (e.g., odd or even numbered PRBs), as density value and comb offset (e.g., density ½ with two comb offsets, density ⅓ with three comb offsets, etc.), or as an index value representing an indication or pattern of PRBs known to the wireless device 110 (e.g., index k, where k identifies a particular PRB pattern known to wireless device 110).

In particular embodiments, network node 120 may transmit to wireless device 110 an indication of a number of successive subframes that the wireless device should use measure CSI-RS. In particular embodiments, network node 120 may receive, from wireless device 110, a channel state information (CSI) based on one or more of the transmitted CSI-RS 135.

According to some embodiments, a wireless device, such as wireless device 110, receives an indication of a subset of PRBs that wireless device 110 should use to measure CSI-RS. Wireless device 110 receives CSI-RS on the indicated subset of PRBs. Wireless device 110 may determine a channel state information (CSI) based on the received CSI-RS (i.e., measure the received CSI-RS to estimate an effective channel) and transmit the CSI to the network node 120.

In wireless network 100, each network node 120 may use any suitable radio access technology, such as long term evolution (LTE), LTE-Advanced, Universal Mobile Telecommunications System (UMTS), High Speed Packet Access (HSPA), GSM, cdma2000, NR, WiMax, Wireless Fidelity (WiFi), and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of network nodes or radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 19A below. Similarly, a network node may include any suitable combination of hardware and/or software. For example, in particular embodiments, a network node, such as network node 120, may include the components described with respect to FIG. 20A below.

According to a first group of example embodiments, an eNB semi-statically configures a UE to measure all ports on a subset of PRBs. NZP CSI-RS corresponding to all ports are transmitted only on the configured PRBs. The eNB Radio Resource Control (RRC) configures the UE with a frequency domain measurement restriction parameter MR_Set which contains all the PRBs that the UE should measure CSI-RS ports on. An example of this embodiment is shown in FIG. 13.

Figure 13:
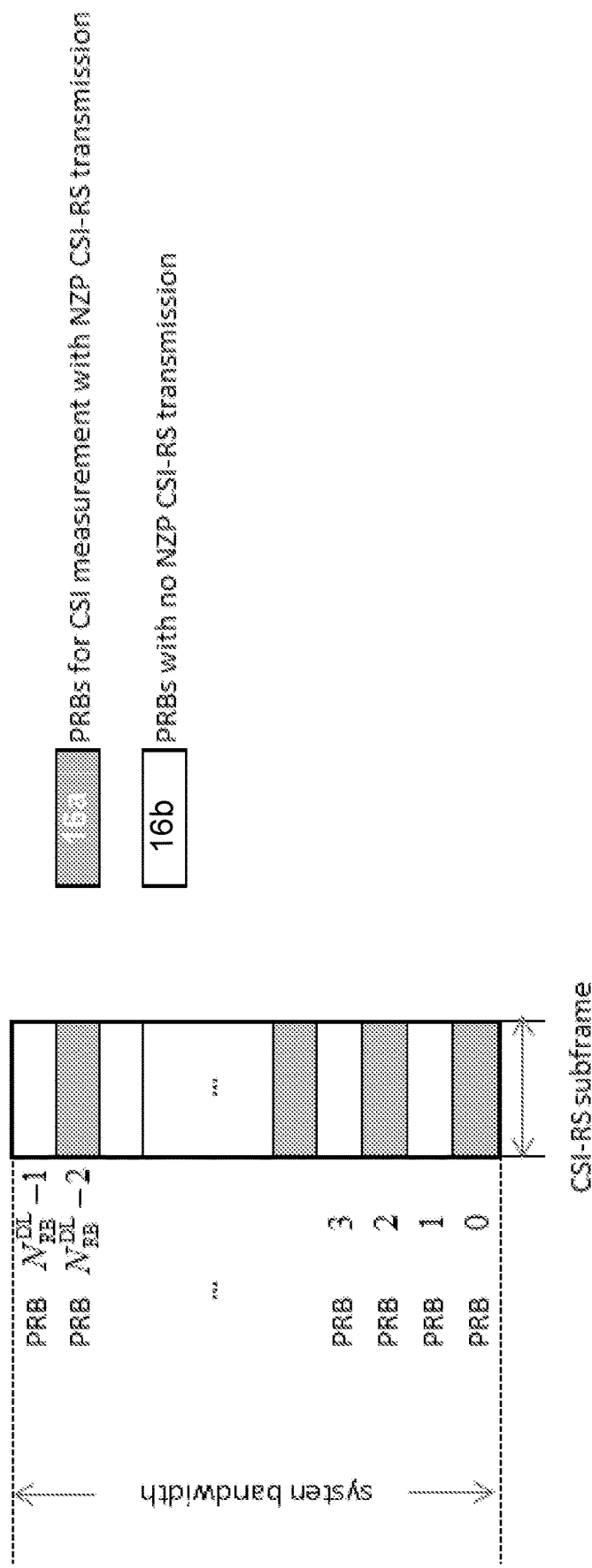
FIG. 13 illustrates an example of CSI-RS transmission where all ports are transmitted on one restricted set of PRBs, in accordance with certain embodiments.

FIG. 13 illustrates an example of CSI-RS transmission where all ports are transmitted on one restricted set of PRBs, in accordance with certain embodiments. In the illustrated example, the system bandwidth, such as the system bandwidth of network 100 described above, comprises $N_{RB}^{DL}-1$ number of PRBs 16. PRBs 16a represent PRBs with no NZP CSI-RS transmission. PRBs 16b represent PRBs for CSI measurement with NZP CSI-RS transmission.

A parameter MR_Set contains the PRBs 0, 2, 4, ..., $N_{RB}^{DL}-2$ (i.e., MR_Set={0, 2, 4, ..., $N_{RB}^{DL}-2$}). The PRB index m in the RE to port mapping formulas in Equation 4 and Equation 7 above is modified as follows:

$$m \in \text{MR\_Set} \quad\quad\quad \text{Equation 9}$$

Alternatively stated, Equation 9 indicates to the UE, such as wireless device 110, that the UE can assume that NZP CSI-RSs corresponding to all NZP CSI-RS ports are transmitted in the PRBs indicated by the set MR_Set, but not necessarily in other PRBs. Therefore, the UE should measure the channel corresponding to the ports in the indicated PRBs. Because the NZP CSI-RS can be transmitted to a UE in a configurable subset of PRBs, the overhead associated with CSI-RS may advantageously be reduced in a configurable way for different deployment scenarios and load conditions.

In some embodiments, the RRC parameter MR_Set may be signaled as a bitmap of length $N_{RB}^{DL}$ wherein the $m^{th}$ bit indicates whether or not NZP CSI-RS is transmitted on the $m^{th}$ PRB. In certain embodiments, the UE is configured to use the value of MR_Set whenever the NZP CSI-RS is transmitted.

In some embodiments, the set of PRB indices are integers that identify which PRBs contain at least one NZP CSI-RS. In a particular embodiment, the integers each comprise the physical resource block number, $n_{PRB}$, as defined in section 6.2.3 of 3GPP TS 36.211.

In the example illustrated in FIG. 13, PRBs for CSI measurement include the even numbered PRBs, and PRBs with no NZP CSI-RS transmission include the odd numbered PRBs. In some embodiments, the RRC parameter MR_Set may be signaled as a value indicating odd or even. The same pattern may be indicated by a combination of density and comb offset. For example, the illustrated example includes a density of ½ (i.e., half the PRBs include CSI-RS and half do not). A first comb offset may indicate that the even numbered PRBs include CS-RS and the odd numbered PRBs do not. A second comb offset may indicate that the odd numbered PRBs include CS-RS and the even numbered PRBs do not. The illustrated example is but one example. Other embodiments may use other densities and comb offsets (e.g., density ⅓ with 3 comb offsets, etc.).

In some embodiments, a UE may build up a channel estimate over the entire band, or a portion thereof, by looking at successive CSI-RS subframes (i.e., subframes that contain CSI-RS) where a different MR_Set is applied over the successive subframes. This may be particularly useful for UEs with low mobility. The eNB may signal over how may successive subframes the UE should measure CSI-RS.

In some embodiments, a fixed number of measurement restriction (MR) patterns in the frequency domain may be predefined. For example, a first measurement restriction pattern in frequency domain may contain NZP CSI-RS in every $2^{nd}$ PRB, a second measurement restriction pattern in frequency domain may contain NZP CSI-RS in every $4^{th}$ PRB, and a third measurement restriction pattern in frequency domain may contain NZP CSI-RS in every PRB. This can be generalized to K different predefined measurement restriction patterns in the frequency domain. The eNB may semi-statically configure the UE to use one of the K predefined measurement restriction patterns in frequency domain. For instance, if the $k^{th}$ measurement restriction pattern in the frequency domain is to be configured for a particular UE, the eNB could semi-statically signal an integer parameter with value k to the UE.

According to a second group of example embodiments, a UE is semi-statically configured to measure channels on a subset of CSI-RS ports on one set of PRBs and another subset of antenna ports on a different set of PRBs. The eNB RRC configures the UE with a first set of frequency domain measurement restriction parameters MR_Set1 that applies to a first set of ports in the CSI-RS resource set CSI-RS_Resource_Set1. Similarly, the eNB RRC configures the UE with a second set of frequency domain measurement restriction parameter MR_Set2 that applies to a second set of ports in the CSI-RS resource set CSI-RS Resource_Set2.

The resources indicated in CSI-RS_Resource_Set1 and CSI-RS Resource_Set2 are chosen from among the resources in the parameter 'nzp-resourceConfigList' indicated by higher layers (see 3GPP TS 36.331). The RRC parameters MR_Set1 and MR_Set2 each contain a list of PRBs in which NZP CSI-RS corresponding to the respective sets are transmitted. An example of this embodiment with 32 CSI-RS ports is shown in FIG. 14.

Figure 14:
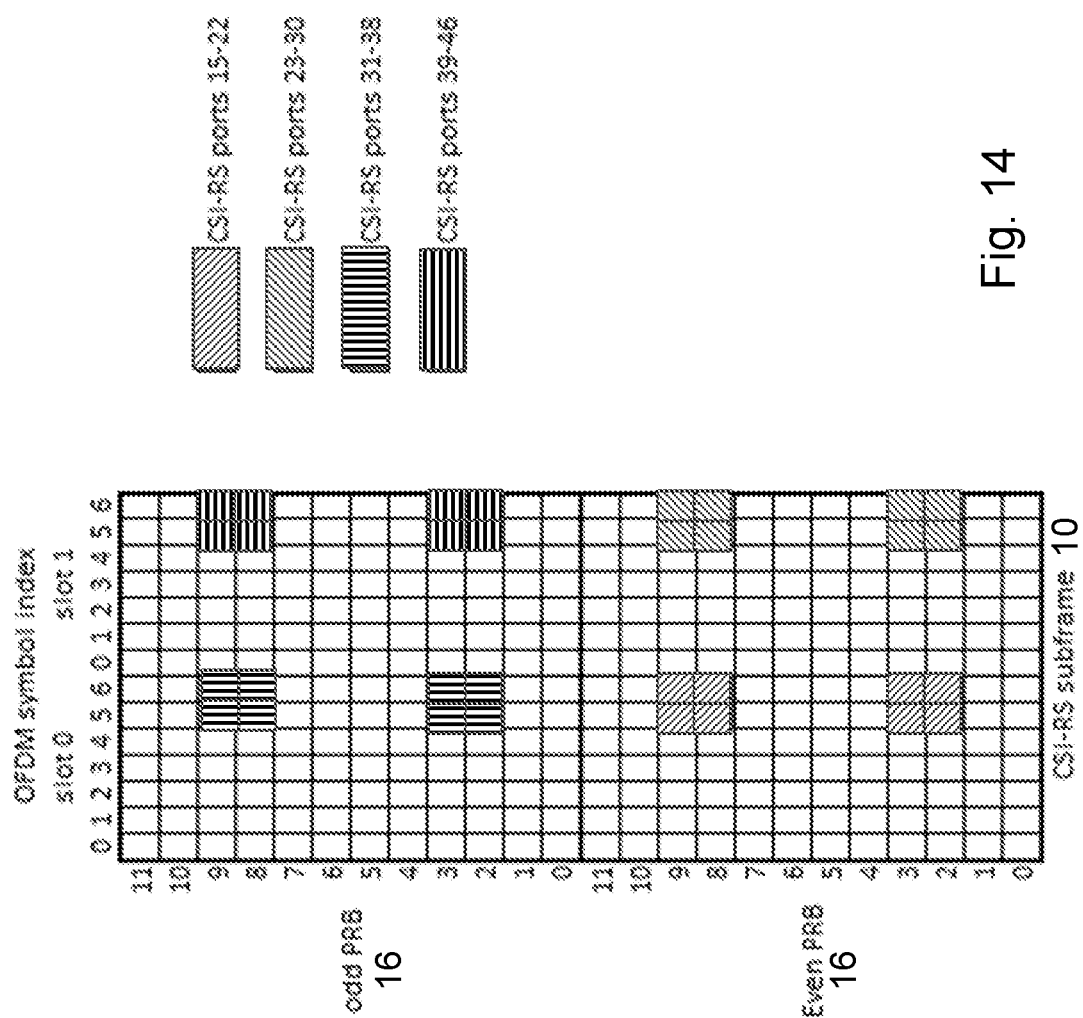
FIG. 14 illustrates an example of CSI-RS transmission where one set of ports are transmitted on one restricted set of PRBs and another set of ports are transmitted on another restricted set of PRBs, in accordance with certain embodiments.

FIG. 14 illustrates an example of CSI-RS transmission where one set of ports are transmitted on one restricted set of PRBs and another set of ports are transmitted on another restricted set of PRBs, in accordance with certain embodiments. The resource element grid illustrated in FIG. 14 includes a portion of a subframe 10 with two PRBs 16.

CSI-RS ports 15-30 are transmitted in even PRBs 16, and CSI-RS ports 31-46 are transmitted in odd PRBs 16. The MR_Set1 parameter corresponding to ports 15-30 contain PRBs 0, 2, 4, 6, . . . (i.e., MR_Set={0, 2, 4, 6, . . . }); the MR_Set2 parameter corresponding to ports 31-46 contain PRBs 1, 3, 5, 7, . . . (i.e., MR_Set2={1, 3, 5, 7, . . . }). Let a quantity i" related to the legacy CSI resource number i' in Equation 5 and Equation 8 be defined as follows:

$$i''=2q'+i' \qquad \text{Equation 10}$$

In Equation 10, q'∈{0,1} where q'=0 corresponds to the first CSI-RS_Resource_Set1 and q'=1 corresponds to the second CSI-RS_Resource_Set2. In the example of FIG. 14, the CSI-RS REs in OFDM symbols 5-6 in slot 0 belong to an 8-port legacy resource (corresponding to legacy resource number i'=0) and the CSI-RS REs in OFDM symbols 5-6 in slot 1 belong to another 8-port legacy resource (corresponding to legacy resource number i'=1).

The quantity i" can be used as a new CSI resource number for the resources in CSI-RS_Resource_Set1 and CSI-RS_Resource_Set2. For CSI-RS_Resource_Set1 (where q'=0), the new CSI reference numbers are i"∈{0,1}; and for CSI-RS_Resource_Set2 (where q'=1), the new CSI reference numbers are i"∈{2,3}. Thus, using Equation 10, the two legacy 8-port resources with legacy CSI resource numbers i'∈{0,1} in the example of FIG. 14 are split into four new 8-port resources with new CSI reference numbers i"∈{0,1,2,3}.

When higher-layer parameter 'cdmType' is set to cdm2 for CSI-RS using more than 8 antenna ports, the port numbering may be given using the new CSI reference numbers as:

$$p = \begin{cases} p' + \dfrac{N_{ports}^{CSI}}{2} i'' & \text{for } p' \in \left\{ \begin{array}{l} 15, \ldots, 15 + \\ N_{ports}^{CSI}/2 - 1 \end{array} \right\} \\ p' + \dfrac{N_{ports}^{CSI}}{2} (i'' + N_{res}^{CSI} - 1) & \text{for } p' \in \left\{ \begin{array}{l} 15 + N_{ports}^{CSI}/2, \ldots, \\ 15 + N_{ports}^{CSI} - 1 \end{array} \right\} \end{cases} \qquad \text{Equation 11}$$

When higher-layer parameter 'cdmType' is set to cdm4 for CSI-RS using more than 8 antenna ports, the antenna port number may be given using the new CSI reference numbers as:

$$p = i'' N_{ports}^{CSI} + p' \qquad \text{Equation 12}$$

For example, in the example of FIG. 14, the new resource with CSI-RS ports 15-22 corresponds to i"=0; the new resource with CSI-RS ports 23-30 corresponds to i"=1; the new resource with CSI-RS ports 31-3 corresponds to i"=2; and the new resource with CSI-RS ports 39-46 corresponds to i"=3. As described earlier, MR_Set1 applies to CSI-RS_Resource_Set1 (corresponding to i"∈{0,1}), and MR_Set2 applies to CSI-RS_Resource_Set2 (corresponding to i"∈{2,3})

To define the RE to port mapping formula for this embodiment, the PRB index m in Equation 4 and Equation 7 is modified as follows:

$$m \in \begin{cases} MR\_Set1, & \text{if } i'' \in CSI-RS\_Resource\_Set1 \\ MR\_Set2, & \text{else if } i'' \in CSI-RS\_Resource\_Set2 \end{cases} \qquad \text{Equation 13}$$

where the new CSI-RS resource number i" is defined as in Equation 10 above.

In some embodiments, the PRBs in the first frequency domain measurement set MR_Set1 may partially overlap with the PRBs in the second frequency domain measurement set MR_Set2. For example, MR_Set1 may contain PRBs {0, 2, 4, 6, 7, 8, 9, 10, 11} and MR_Set2 may contain PRBs {7, 8, 9, 10, 11, 13, 15, 17}, where PRBs {7, 8, 9, 10, 11} are common to the two sets.

In yet another embodiment, MR_Set1 may contain all the PRBs in the system bandwidth and be applied to a first set of ports in the CSI-RS resource set CSI-RS_Resource_Set1. The second measurement restriction set, MR_Set2, may contain a subset of PRBs and be applied to a second set of ports in the CSI-RS resource set CSI-RS_Resource_Set2. An example is shown in FIG. 15.

Figure 15:
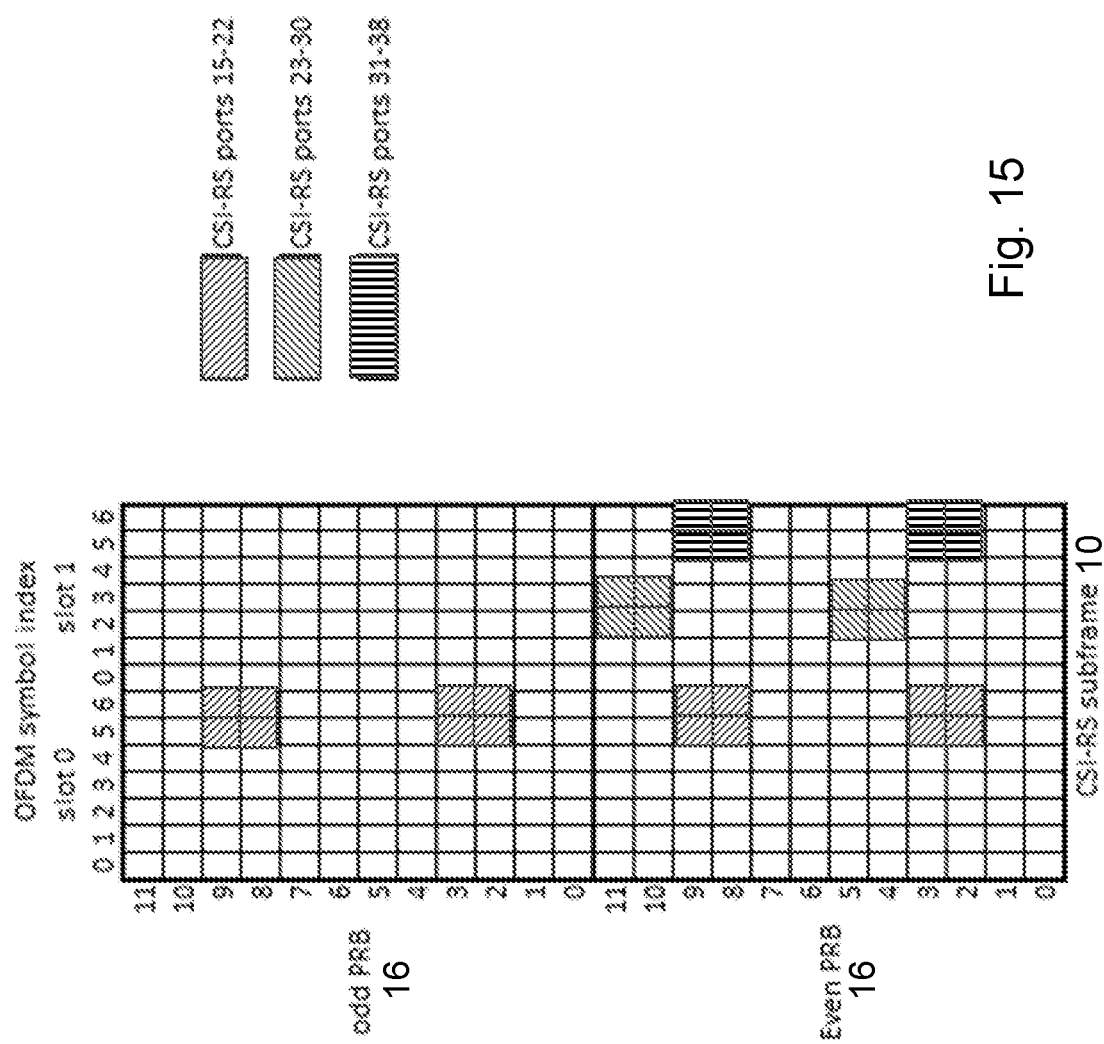
FIG. 15 illustrates an example of CSI-RS transmission where one set of ports are transmitted on all PRBs and another set of ports are transmitted on a restricted set of PRBs, in accordance with certain embodiments.

FIG. 15 illustrates an example of CSI-RS transmission where one set of ports are transmitted on all PRBs and another set of ports are transmitted on a restricted set of PRBs, in accordance with certain embodiments. The resource element grid illustrated in FIG. 15 includes a portion of a subframe 10 with two PRBs 16. CSI-RS ports 15-22 are transmitted in both PRBs 16, while CSI-RS ports 23-38 are transmitted in even PRB 16.

In some embodiments, the eNB RRC configures the UE with K sets of frequency domain measurement restriction parameters MR_Setk, with k∈{0, 1, . . . , K−1} that applies to a $k^{th}$ set of ports in the $k^{th}$ CSI-RS resource set CSI-RS_Resource_Setk. The new CSI-RS reference number of Equation 10 is modified as:

$$i''=Kq'+i' \quad \text{Equation 14}$$

Furthermore, the RE to port mapping formula in Equation 13 is modified as follows, where a new CSI-RS resource number i" in the $k_{th}$ CSI-RS resource set maps to a PRB index m $$m \in MR\_SetA \text{ if } i'' \in CSI\text{-}RS\_Resourc\ e\_Setk \quad \text{Equation 15}$$

In some embodiments, CSI-RS port sets are RRC configured to the UE instead of CSI-RS resource sets. For example, if CSI-RS port_set1={15-30} and CSI-RS_port-set2={31-46}, then MR_Set1 is applied to ports {15-30} and MR_Set2 is applied to ports {31-46}.

A third group of example embodiments includes multiple ZP CSI-RS subframe configurations. As shown in Table 4 above, ZP CSI-RS for a serving cell can only be configured with a single CSI-RS-SubframeConfig parameter $I_{CSI\text{-}RS}$. This means that a UE can be configured with only one ZP CSI-RS in one subframe within the UE's configured ZP CSI-RS period $T_{CSI\text{-}RS}$.

However, with the increased number of CSI-RS ports in LTE Release 14, achieving higher reuse factors wherein SINR can be improved through ZP CSI-RS than 1 for CSI-RS within a single subframe is not possible. This is because a given PRB within a subframe only includes 40 available CSI-RS REs. If 32 of the REs are used for NZP CSI-RS by one cell, only one cell can transmit NZP CSI-RS in a subframe. Thus, to facilitate higher reuse factors wherein SINR can be improved through ZP CSI-RS, in this embodiment, a UE may be RRC configured with one NZP CSI-RS in a CSI process and ZP CSI-RSs that occur in multiple subframes within one ZP CSI-RS period in the CSI process. This may comprise configuring a UE with a first and a second zero power CSI-RS occurring in a first and a second subframe, wherein at least one of the first and second CSI-RS has a periodicity of P subframes, and wherein the first and second subframes are distinct within the period P.

Figure 16:
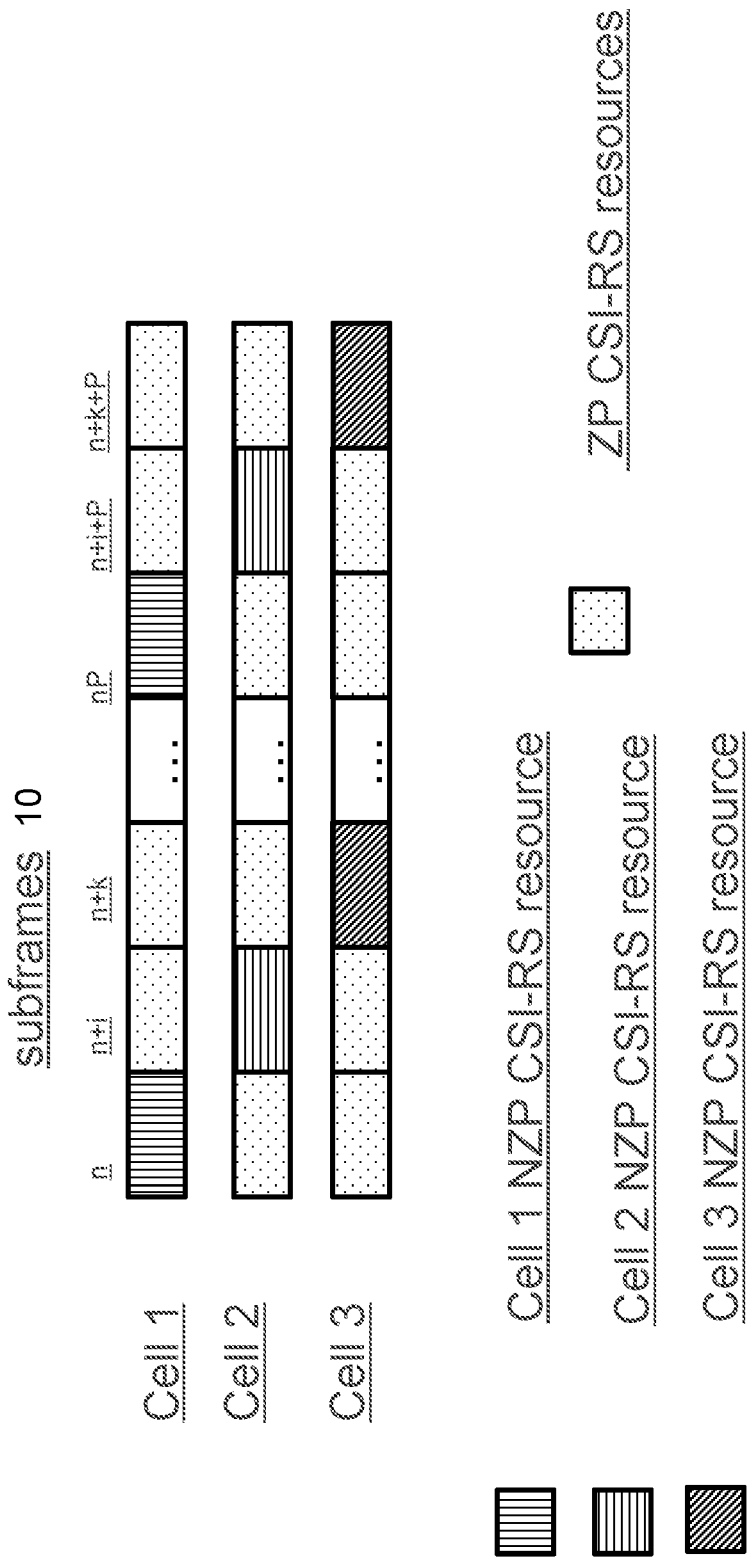
FIG. 16 illustrates an example of configuring multiple ZP CSI-RS subframes, in accordance with certain embodiments.

FIG. 16 illustrates an example of configuring multiple ZP CSI-RS subframes, in accordance with certain embodiments. More particularly, FIG. 16 illustrates an example of three cells with CSI-RS configured in different subframes.

For each cell, two ZP CSI-RS are also configured in the subframes and REs where CSI-RS of the other two cells are configured. For example, ZP CSI-RS for cell1 is configured in subframes n+i, n+k, n+i+P and n+k+P, which coincide with the CSI-RS of cells 2 and 3. The first ZP CSI-RS for cell1 is configured in subframes n+i, n+i+P, . . . and the second ZP CSI-RS is configured in subframes n+k,n+k+P, . . . . In this case, the periodicities of the two ZP CSI-RS are the same. When different periodicities are configured for CSI-RS in the three cells, then P may also be different for ZP CSI-RS.

Particular embodiments include RRC configuring the UE with multiple ZP CSI-RS subframe configurations. In a further embodiment, the UE is RRC configured with multiple configuration pairs, where each pair comprises a ZP CSI-RS resource configuration that corresponds to a ZP CSI-RS subframe configuration in the pair. Through these embodiments, the network can configure a UE with ZP CSI-RS in multiple subframes where the ZP CSI-RS occupies the same REs as NZP CSI-RS intended for other UEs. In this way, an eNB transmitting to a UE need not transmit PDSCH or an interfering NZP CSI-RS in the NZP CSI-RS intended for other UEs, which avoids interfering with the NZP CSI-RS intended for the other UEs. This will facilitate multiple serving cells to transmit NZP CSI-RS with a large number of ports (i.e., 32 ports) while avoiding interfering with neighboring cells' NZP CSI-RS.

Figure 17:
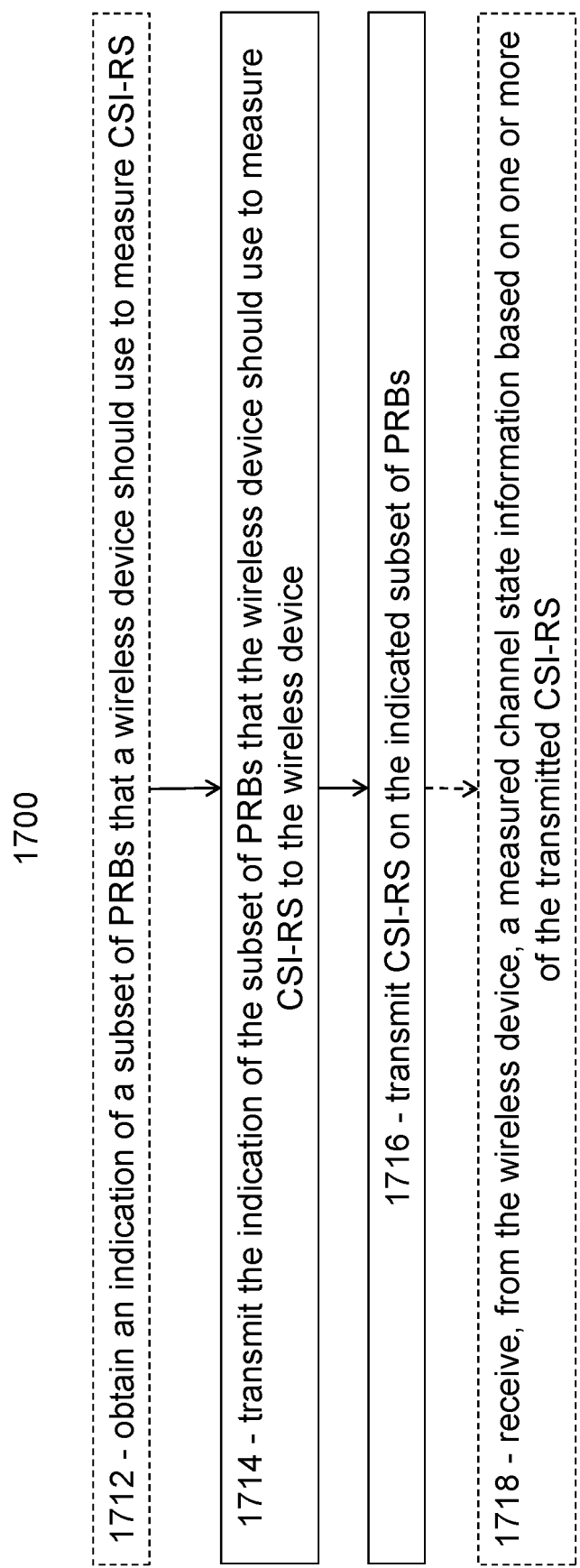
FIG. 17 is a flow diagram illustrating an example method in a network node of transmitting channel state information reference signals (CSI-RS), according to some embodiments.
Figure 18:
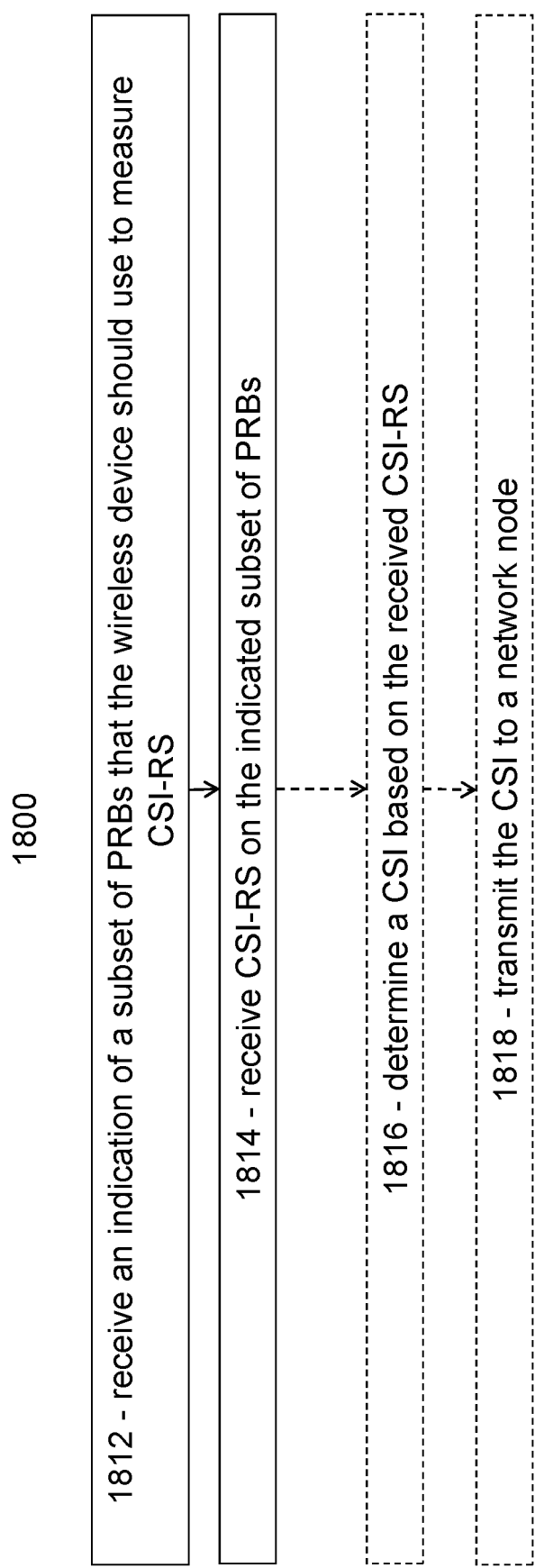
FIG. 18 is a flow diagram illustrating an example method in a wireless device of receiving channel state information reference signals (CSI-RS), according to some embodiments.

The examples described with respect to FIGS. 12-16 may be generally represented by the flowcharts in FIG. 17 (with respect to a network node) and FIG. 18 (with respect to a wireless device).

FIG. 17 is a flow diagram illustrating an example method in a network node of transmitting CSI-RS, according to some embodiments. In particular embodiments, one or more steps of FIG. 17 may be performed by network node 120 of wireless network 100 described with respect to FIG. 12.

The method begins at step 1712, where a network node may obtain an indication of a subset of PRBs that a wireless device should use to measure CSI-RS. For example network node 120 may obtain an indication of a subset of PRBs that wireless device 110 may use to measure CSI-RS.

Obtaining the indication may include retrieving a predetermined indication from memory, receiving signaling from another component of network 100, or any other suitable configuration. The particular indication may be determined based on factors such as deployment scenarios and load conditions.

At step 1714, the network node transmits the indication of the subset of PRBs that the wireless device should use to measure CSI-RS to the wireless device. For example, network node 120 may transmit the indication of the subset of PRBs that wireless device 110 should use to measure CSI-RS to wireless device 110. The transmitting may include RRC signaling, or any other suitable communication between network node 120 and wireless device 100.

The indication of the subset of PRBs may comprise various formats, such as the formats described above with respect to FIGS. 13-16. For example, the format may include a bitmap, an odd/even value, a density and comb offset, an index identifying a particular format of a group of formats known to the wireless device, etc. In some embodiments, the indication may include a number of subframes that wireless device 110 should use to measure CSI-RS.

At step 1716, the network node transmits CSI-RS on the indicated subset of PRBs. For example, network node 120 may transmit CSI-RS in the PRBs that network node 120 previously indicated to wireless device 110.

At step 1718, the network node may receive, from the wireless device, a measured channel state information based on one or more of the transmitted CSI-RS ports. For example, wireless device 110 may determine a CSI based on measurements of one or more of the transmitted CSI-RS and send the CSI back to network node 120.

Modifications, additions, or omissions may be made to method 1700. Additionally, one or more steps in method 1700 of FIG. 17 may be performed in parallel or in any suitable order. The steps of method 1700 may be repeated over time as necessary.

FIG. 18 is a flow diagram illustrating an example method in a wireless device of receiving CSI-RS, according to some embodiments. In particular embodiments, one or more steps of FIG. 18 may be performed by wireless device 110 of wireless network 100 described with respect to FIG. 12.

The method begins at step 1812, where the wireless device receives an indication of a subset of PRBs that the wireless device should use to measure CSI-RS. For example, wireless device 110 may receive, from network node 120, an indication of a subset of PRBs that wireless device 110 should use to measure CSI-RS. The indication may comprise any of the indications described above with respect FIGS. 13-16 (e.g., the indication transmitted at step 1714 of FIG. 17).

At step 1814, the wireless device receives CSI-RS on the indicated subset of PRBs. For example, wireless device 110 may receive CSI-RS on the indicated PRBs 16 from network node 120.

At step 1816, the wireless device may determine a CSI based on the received CSI-RS. For example, wireless device 110 may use the received indication to measure CSI-RS on the indicated PRBs 16 to estimate an effective channel between network node 120 and wireless device 110. In some embodiments, wireless device 110 may measure the CSI-RS over multiple subframes.

At step 1818, the wireless device may transmit the CSI to a network node. For example, wireless device 110 may transmit the CSI to network node 120.

Modifications, additions, or omissions may be made to method 1800. Additionally, one or more steps in method 1800 of FIG. 18 may be performed in parallel or in any suitable order. The steps of method 1800 may be repeated over time as necessary.

Figure 19B:
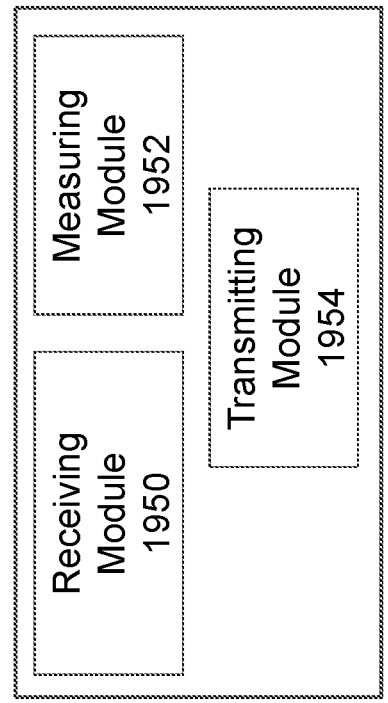
FIG. 19B is a block diagram illustrating example components of a wireless device.
Figure 19A:
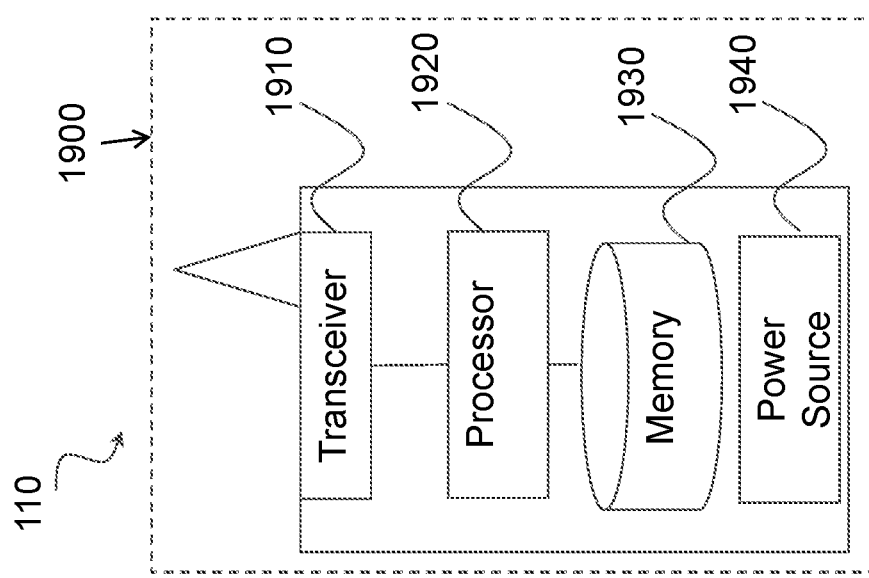
FIG. 19A is a block diagram illustrating an example embodiment of a wireless device.

FIG. 19A is a block diagram illustrating an example embodiment of a wireless device. The wireless device is an example of the wireless devices 110 illustrated in FIG. 12. In particular embodiments, the wireless device is capable of receiving an indication of a subset of PRBs that the wireless device should use to measure CSI-RS, and receiving CSI-RS on the indicated subset of PRBs. In particular embodiments, the wireless device may be capable of measuring the received CSI-RS ports to estimate an effective channel and determine a CSI, and transmitting the CSI to a network node.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes processing circuitry 1900. Processing circuitry 1900 includes transceiver 1910, processor 1920, memory 1930, and power source 1940. In some embodiments, transceiver 1910 facilitates transmitting wireless signals to and receiving wireless signals from wireless network node 120 (e.g., via an antenna), processor 1920 executes instructions to provide some or all of the functionality described herein as provided by the wireless device, and memory 1930 stores the instructions executed by processor 1920. Power source 1940 supplies electrical power to one or more of the components of wireless device 110, such as transceiver 1910, processor 1920, and/or memory 1930.

Processor 1920 includes any suitable combination of hardware and software implemented in one or more integrated circuits or modules to execute instructions and manipulate data to perform some or all of the described functions of the wireless device. In some embodiments, processor 1920 may include, for example, one or more computers, one more programmable logic devices, one or more central processing units (CPUs), one or more microprocessors, one or more applications, and/or other logic, and/or any suitable combination of the preceding. Processor 1920 may include analog and/or digital circuitry configured to perform some or all of the described functions of wireless device 110. For example, processor 1920 may include resistors, capacitors, inductors, transistors, diodes, and/or any other suitable circuit components.

Memory 1930 is generally operable to store computer executable code and data. Examples of memory 1930 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 1940 is generally operable to supply electrical power to the components of wireless device 110. Power source 1940 may include any suitable type of battery, such as lithium-ion, lithium-air, lithium polymer, nickel cadmium, nickel metal hydride, or any other suitable type of battery for supplying power to a wireless device.

In particular embodiments, processor 1920 in communication with transceiver 1910 receives an indication of a subset of PRBs that the wireless device should use to measure CSI-RS, and receives CSI-RS on the indicated subset of PRBs. In particular embodiments, processor 1920 in communication with transceiver 1910 may measure the received CSI-RS to estimate an effective channel, and transmit a CSI to a network node.

Other embodiments of the wireless device may include additional components (beyond those shown in FIG. 19A) responsible for providing certain aspects of the wireless device's functionality, including any of the functionality described above and/or any additional functionality (including any functionality necessary to support the solution described above). FIG. 19B is a block diagram illustrating example components of a wireless device 110. The components may include receiving module 1950, measuring module 1952, and transmitting module 1954.

Receiving module 1950 may perform the receiving functions of wireless device 110. For example, receiving module 1950 may receive an indication of a subset of PRBs that the wireless device should use to measure CSI-RS, and receive CSI-RS on the indicated subset of PRBs according to any of the examples described with respect to FIGS. 12-18. In certain embodiments, receiving module 1950 may include or be included in processor 1920. In particular embodiments, receiving module 1950 may communicate with measuring module 1952 and transmitting module 1954.

Measuring module 1952 may perform the measuring functions of wireless device 110. For example, measuring module 1952 may estimate a wireless channel using the received CSI-RS. Measuring module 1952 may determine a CSI based on the estimation. In certain embodiments, measuring module 1952 may include or be included in processor 1920. In particular embodiments, measuring module 1952 may communicate with receiving module 1950 and transmitting module 1954.

Transmitting module 1954 may perform the transmitting functions of wireless device 110. For example, transmitting module 1954 may transmit a CSI to network node 120. In certain embodiments, transmitting module 1954 may include or be included in processor 1920. In particular embodiments, transmitting module 1954 may communicate with receiving module 1950 and measuring module 1952.

Figure 20B:
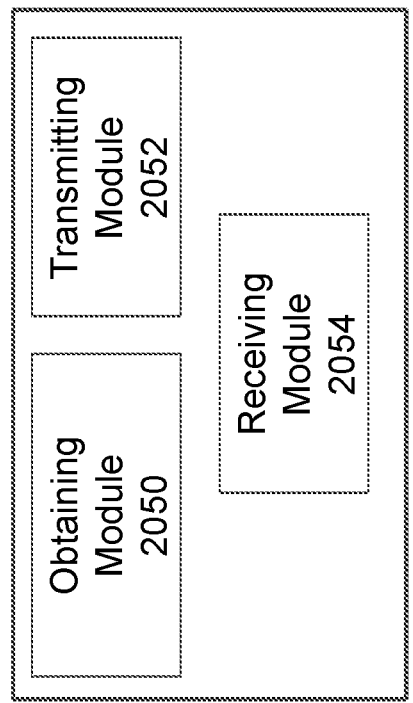
FIG. 20B is a block diagram illustrating example components of a network node.
Figure 20A:
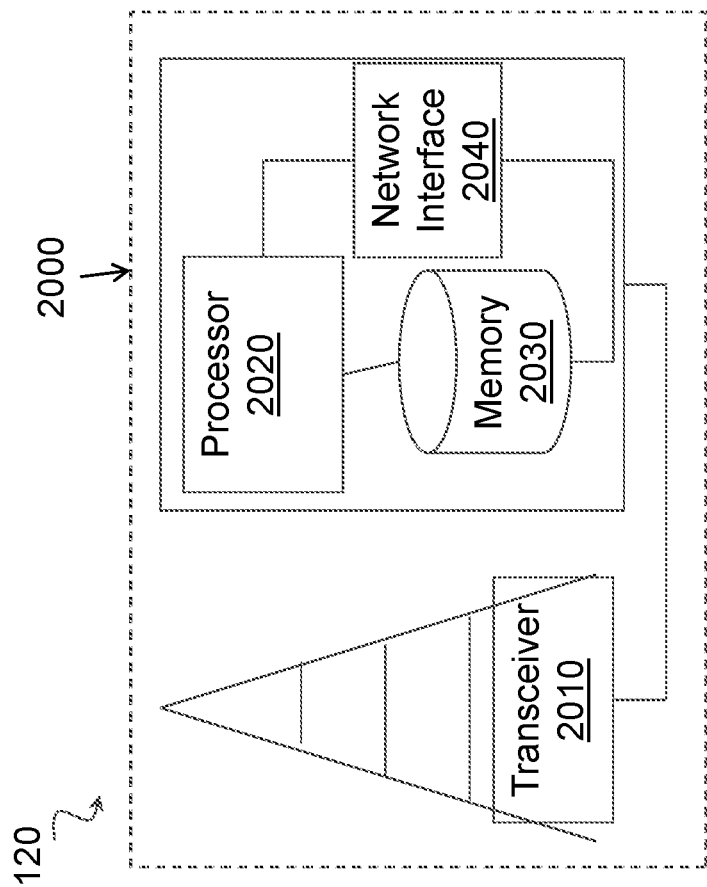
FIG. 20A is a block diagram illustrating an example embodiment of a network node.

FIG. 20A is a block diagram illustrating an example embodiment of a network node. The network node is an example of the network node 120 illustrated in FIG. 12. In particular embodiments, the network node is capable of: obtaining an indication of a subset of physical resource blocks (PRBs) that a wireless device should use to measure CSI-RS; transmitting, to the wireless device, the indication of the subset of PRBs that the wireless device should use to measure CSI-RS; and transmitting CSI-RS on the indicated subset of PRBs.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. The network node includes processing circuitry 2000. Processing circuitry 2000 includes at least one transceiver 2010, at least one processor 2020, at least one memory 2030, and at least one network interface 2040. Transceiver 2010 facilitates transmitting wireless signals to and receiving wireless signals from a wireless device, such as wireless devices 110 (e.g., via an antenna); processor 2020 executes instructions to provide some or all of the functionality described above as being provided by a network node 120; memory 2030 stores the instructions executed by processor 2020; and network interface 2040 communicates signals to backend network components, such as a gateway, switch, router, Internet, Public Switched Telephone Network (PSTN), controller, and/or other network nodes 120. Processor 2020 and memory 2030 can be of the same types as described with respect to processor 1920 and memory 1930 of FIG. 19A above.

In some embodiments, network interface 2040 is communicatively coupled to processor 2020 and refers to any suitable device operable to receive input for network node 120, send output from network node 120, perform suitable processing of the input or output or both, communicate to other devices, or any combination of the preceding. Network interface 2040 includes appropriate hardware (e.g., port, modem, network interface card, etc.) and software, including protocol conversion and data processing capabilities, to communicate through a network.

In particular embodiments, processor 2020 in communication with transceiver 2010 is operable to: obtain an indication of a subset of PRBs that a wireless device should use to measure CSI-RS; transmit, to the wireless device, the indication of the subset of PRBs that the wireless device should use to measure CSI-RS; and transmit CSI-RS on the indicated subset of PRBs.

Other embodiments of network node 120 include additional components (beyond those shown in FIG. 20A) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

FIG. 20B is a block diagram illustrating example components of a network node 120. The components may include obtaining module 2050, transmitting module 2052, and receiving module 2054.

Obtaining module 2050 may perform the obtaining functions of network node 120. For example, obtaining module 2050 may obtain an indication of a subset of PRBs that a wireless device should use to measure CSI-RS according to any of the examples described with respect to FIGS. 12-18. In certain embodiments, obtaining module 2050 may include or be included in processor 2020. In particular embodiments, obtaining module 2050 may communicate with transmitting module 2052 and receiving module 2054.

Transmitting module 2052 may perform the transmitting functions of network node 120. For example, transmitting module 2052 may transmit an indication of the subset of PRBs that a wireless device should use to measure CSI-RS, and transmit CSI-RS on one or more PRBs according to any of the examples described with respect to FIGS. 12-18. In certain embodiments, transmitting module 2052 may include or be included in processor 2020. In particular embodiments, transmitting module 2052 may communicate with obtaining module 2050 and receiving module 2054.

Receiving module 2054 may perform the receiving functions of network node 120. For example, receiving module 2054 may receive a CSI from wireless device 110. In certain embodiments, receiving module 2054 may include or be included in processor 1920. In particular embodiments, receiving module 2054 may communicate with obtaining module 2050 and transmitting module 2052.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

Particular embodiments may be implemented within the framework of a particular communication standard. The following examples provide a non-limiting example of how the proposed solutions could be implemented within the framework of a 3GPP TSG RAN standard. The changes described are merely intended to illustrate how certain aspects of the proposed solutions could be implemented in a particular standard. However, the proposed solutions could also be implemented in other suitable manners, both in the 3GPP Specification and in other specifications or standards.

For example, particular standards may include the following agreements with regards to CSI-RS design for Class A eFD-MIMO. For {20, 24, 28, 32} ports, a CSI-RS resource for class A CSI reporting may comprise an aggregation of K CSI-RS configurations [i.e. RE patterns]. The number of REs in the $k^{th}$ configuration $N_k \in \{4, 8\}$. The same $N_k = N$ may be used for all k. The following are not precluded: (a) per-port CSI-RS density per PRB=1; (b) different per-port CSI-RS densities for different CSI-RS ports.

Particular examples include TDM. A UE may measure and report one set of ports in one subframe and a remaining set of ports are measured and reported in another subframe. A challenge with this scheme is how the eNB combines the CSI reports measured on different sets of CSI-RS ports on different subframes. Furthermore, if the CSI corresponding to different sets of CSI-RS ports are measured/reported on different CSI-RS subframes, the reported CSI may be adversely affected by frequency drift/Doppler over the subframes. Simulation results with 24 ports indicate that the TDM based scheme can suffer between 10-20% link throughput loss compared to the FDM scheme in the SNR range 0-10 dB.

With regards to the overhead of the TDM scheme, the TDM scheme does not reduce CSI-RS overhead over one CSI-RS transmission periodicity. This is illustrated by a comparison between the TDM scheme and a CSI-RS scheme where all ports are measured in a single subframe in FIGS. 21A and B.

Figure 21A:
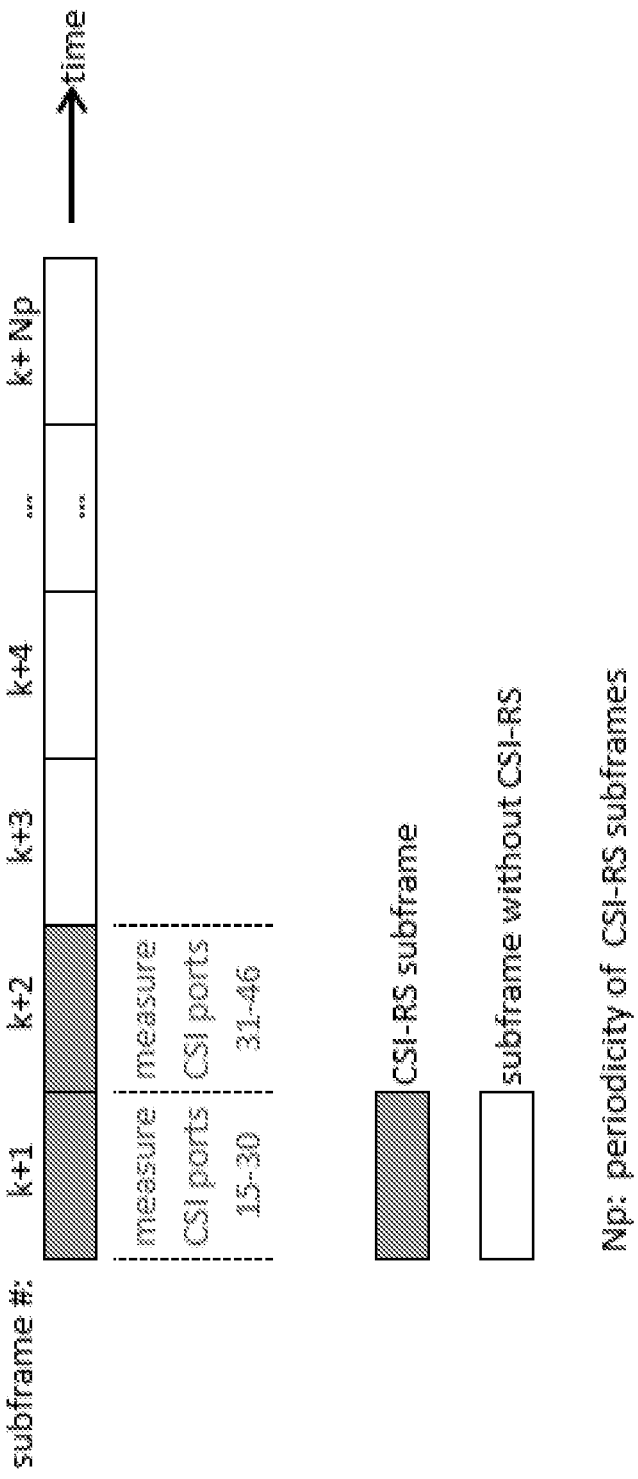
FIGS. 21A and B illustrate examples of overhead for a TDM scheme.

In FIG. 21A, a CSI-RS design based on the TDM scheme for 32 ports is depicted where CSI ports 15-30 are measured in subframe (k+1) and CSI ports 31-46 are measured in subframe (k+2). Assuming a system with 2 CRS ports, 3 OFDM symbols for PDCCH, 2 DMRS ports, and CSI-RS periodicity Np=5 ms, then the CSI-RS overhead of the TDM scheme over one CSI-RS period is approximately 6%.

Figure 21B:
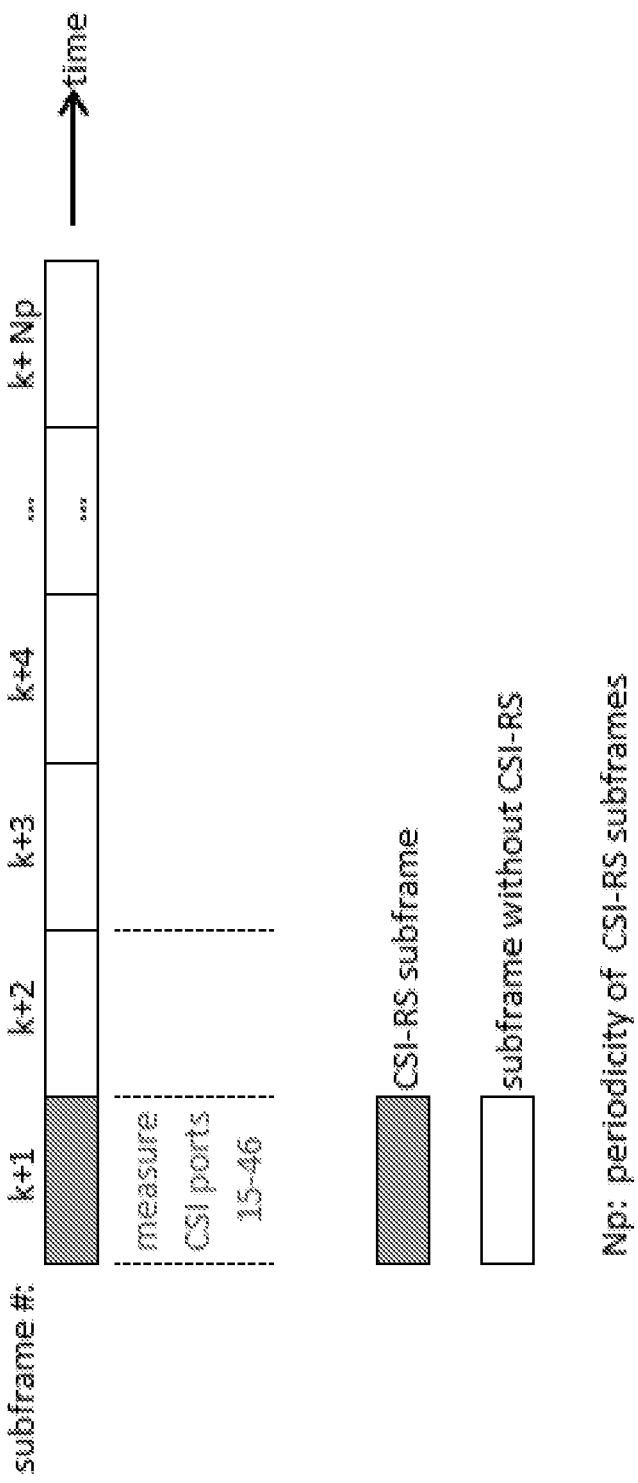

Under the same assumption, the scheme in FIG. 21B where all 32 ports are measured in subframe (k+1) achieves the same CSI-RS overhead of 6%. From this comparison, it is evident that the TDM scheme does not reduce the CSI-RS overhead and merely distributes the overhead over different subframes.

In some embodiments, the TDM scheme can be down-selected since it does not reduce CSI-RS overhead and merely distributes the CSI-RS overhead over different subframes.

Particular examples include FDM. A UE may be configured to measure channels on a subset of CSI-RS ports on one fixed set of PRBs and another subset of antenna ports on a different fixed set of PRBs. A 32-port example is shown in FIG. 14. In this example, CSI-RS ports 15-30 are transmitted in even PRBs and CSI-RS ports 31-46 are transmitted in odd PRBs.

Evaluating the performance of the FDM scheme may include system level simulations using a 32 port 8×4 dual polarized array with 2×1 subarray virtualization. The performance of a FDM scheme with a CSI-RS density of 0.5 RE/RB/port may be compared to that of CSI-RS design with full density (i.e., 1 RE/RB/port). The results for the 3D-UMi and 3D-UMa scenarios are given in Table 5 and Table 6, respectively. In these results, the 32 port CSI-RS resource is attained by aggregating four 8-port CSI-RS configurations with CDM-4 and 3 dB power boosting.

TABLE 5

Performance comparison in 3D-UMi

| | Reference RU [%] | | | | | |
|---|---|---|---|---|---|---|
| | 5 | | 20 | | 50 | |
| | Reference offered traffic [bps/Hz/cell] | | | | | |
| | 0.20 | | 0.63 | | 1.15 | |
| | FDM Scheme | Full CSI-RS Density | FDM Scheme | Full CSI-RS Density | FDM Scheme | Full CSI-RS Density |
| Cell edge throughput [bps/Hz/user] | 2.00 | 1.99 | 1.09 | 1.14 | 0.36 | 0.48 |
| Mean throughput [bps/Hz/user] | 4.44 | 4.34 | 3.53 | 3.51 | 2.13 | 2.33 |
| Cell edge gain [%] | 1 | 0 | −4 | 0 | −25 | 0 |
| Mean throughput gain [%] | 2 | 0 | 1 | 0 | −9 | 0 |

TABLE 6

Performance comparison in 3D-UMa

| | Reference RU [%] | | | | | |
|---|---|---|---|---|---|---|
| | 5 | | 20 | | 50 | |
| | Reference offered traffic [bps/Hz/cell] | | | | | |
| | 0.19 | | 0.55 | | 0.91 | |
| | FDM Scheme | Full CSI-RS Density | FDM Scheme | Full CSI-RS Density | FDM Scheme | Full CSI-RS Density |
| Cell edge throughput [bps/Hz/user] | 1.80 | 1.83 | 0.93 | 1.02 | 0.19 | 0.39 |
| Mean throughput [bps/Hz/user] | 4.26 | 4.18 | 3.27 | 3.25 | 1.56 | 2.09 |
| Cell edge gain [%] | −2 | 0 | −9 | 0 | −51 | 0 |
| Mean throughput gain [%] | 2 | 0 | 1 | 0 | −25 | 0 |

| Simulation parameters | |
|---|---|
| Carrier frequency | 2 GHz |
| Bandwidth | 10 MHz |
| Scenarios | 3D UMi 200 m ISD, 3D UMa 500 m ISD |
| Antenna Configurations | 8 × 4 with 2 × 1 virtualization tilt: 130° for 3D-UMi and 122° for 3D-UMa |
| Wrapping | Radio distance based |

TABLE 6-continued

| | |
|---|---|
| UE receiver | MMSE-IRC |
| CSI periodicity | 5 ms |
| CSI delay | 5 ms |
| CSI mode | PUSCH Mode 3-2 |
| Outer loop Link Adaptation | Yes, 10% BLER target |
| UE noise figure | 9 dB |
| eNB Tx power | 41 dBm (3D-UMi), 46 dBm (3D-UMa) |
| Traffic model | FTP Model 1, 500 kB packet size |
| UE speed | 3 km/h |
| Scheduling | Proportional fair in time and frequency |
| CRS interference | Not modeled. Overhead accounted for 2 CRS ports. |
| DMRS overhead | 2 DMRS ports |
| CSI-RS | Overhead accounted for. Channel estimation error modeled. Reuse factor 1 assumed. |
| Codebook | 2D Grid of Beams based on DFT |
| HARQ | Max 5 retransmissions |
| Antenna spacing | 0.8 lambda in vertical, 0.5 lambda in horizontal |
| Handover margin | 3 dB |

These results show that the FDM scheme attains a small mean throughput gain of 2% at a very low resource utilization of 5% due to the lower overhead advantage it has over the full density CSI-RS scheme. However, at higher resource utilizations, the FDM scheme suffers notable throughput losses. At 50% RU, the cell edge performance of the FDM scheme is 25% (in 3D-UMi) and 53% (in 3D-UMa) lower than the full density CSI-RS scheme. This loss is mainly due to the reduced processing gain associated with FDM scheme when compared to the full density CSI-RS scheme.

FDM scheme with 0.5 RE/RB/port attains small gains at very small loads but suffers significant losses at medium to high loads when compared to a CSI-RS design with a density of 1 RE/RB/port. Thus, given the results in Table 5 and Table 6, FDM based designs with fixed CSI-RS densities may not be a good solution due to its poor performance at high loads. To ensure good performance at medium to high load conditions, sufficient configurability in the CSI-RS design should be allowed to also have per-port CSI-RS densities of 1 RE/RB/port in addition to CSI-RS densities lower than 1 RE/RB/port.

FDM based CSI-RS designs with fixed CSI-RS densities may not be considered for Class A eFD-MIMO. Sufficient configurability in the CSI-RS design should be allowed to also have per-port CSI-RS densities of 1 RE/RB/port in addition to CSI-RS densities lower than 1 RE/RB/port.

Particular embodiments include measurement restriction in the frequency domain. Because specifying enhancements of {20, 24, 28, 32} CSI-RS ports with mechanism for reducing the overhead for CSI-RS transmission is one of the objectives of an eFD-MIMO standard, a more flexible approach is to allow the density of the CSI-RS design to be configurable. This can be achieved via measurement restriction (MR) in frequency domain where a UE can be requested to measure channels on a configurable set of PRBs. CSI-RS is only transmitted in PRBs in which the UE is requested to perform channel measurements. The MR in frequency domain may be semi-statically configured and may be RRC signaled to the UE.

Because the MR in frequency domain is configurable, the density of the CSI-RS port can be flexibly chosen to suit the deployment scenario. For instance, for low-load, low-delay spread conditions, CSI-RS ports can be configured with reduced density. For high-load and/or high delay spread conditions, a higher density can be configured for CSI-RS ports to avoid the performance losses demonstrated in the results of Table 5 and Table 6.

Several alternatives for reducing per-port CSI-RS density can be achieved via MR in frequency domain. A few examples include the following.

FDM: With MR in frequency domain, FDM schemes with different CSI-RS densities can be achieved. For instance, the 32 port reduced density CSI-RS example of FIG. 14 can be achieved by configuring the UE to measure CSI-RS ports 15-30 on PRBs 0, 2, 4, 6, . . . and to measure CSI-RS ports 31-46 on PRBs 1, 3, 5, 7, . . . . Other density reduction factors (i.e., 3 or 4) can also be configured with MR in frequency domain if such reduction factor are suitable for a given deployment scenario.

Partial Overlapping: Partially overlapping CSI-RS designs can be attained with MR in frequency domain. Considering the 32-port example given in FIG. 15, the UE is configured to measure CSI-RS ports 23-38 only on PRBs 1, 3, 5, 7, . . . . For CSI-RS ports 15-22, the UE is configured to measure CSI-RS on all PRBs.

Partial bandwidth measurements: MR in frequency domain can be effectively used to probe the UE to measure CSI-RS only on one or more subbands in the context of aperiodic CSI-RS.

Full CSI-RS density: A per-port CSI-RS density of 1 RE/port/PRB can be achieved via MR in frequency domain by configuring the UE to measure CSI-RS on all PRBs.

MR in frequency domain can be applied for cases with different CSI-RS resources with different number of ports and cases involving different CDM designs.

Given these advantages, particular embodiments include measurement restriction in frequency domain used to achieve many of the alternatives for reducing per-port CSI-RS density including FDM, partial overlapping, partial bandwidth, and full CSI-RS density. For Class A eFD-MIMO, measurement restriction in the frequency domain provides good flexibility to configure the density of CSI-RS according to the deployment scenario and load conditions.

Some embodiments include CSI-RS SINR improvements. The performance of a 32-port CSI-RS design with CDM-4 and 3 dB power boosting (9 dB gain) may be compared to the upper bound performance of a 32-port CSI-RS design with 15 dB gain. Both cases assume a CSI-RS density of 1 RE/RB/port and a 32 port 8×4 dual polarized array with 2×1 subarray virtualization. Detailed simulation parameters are given above.

The results for the 3D-UMi and 3D-UMa scenarios at 50% resource utilization are given in Table 7. These results show cell-edge throughput upper bound gains of 29-41% when using the 15 dB gain when compared to the case with 9 dB gain. The corresponding mean throughput gains are in the range of 11-12%. This suggests that further gains are possible if the CSI-RS SINR can be further improved.

TABLE 7

Performance comparison between 9 dB and 15 dB gain cases at 50% reference RU

| | Scenario | | | |
|---|---|---|---|---|
| | 3D-UMi | | 3D-UMa | |
| | Reference offered traffic [bps/Hz/cell] | | | |
| | 1.15 | | 0.91 | |
| | Performance with 9 dB Gain | Upper Bound with 15 dB Gain | Performance with 9 dB Gain | Upper Bound with 15 dB Gain |
| Cell edge throughput [bps/Hz/user] | 0.48 | 0.62 | 0.39 | 0.55 |
| Mean throughput [bps/Hz/user] | 2.33 | 2.58 | 2.09 | 2.35 |
| Cell edge gain [%] | 0 | 29 | 0 | 41 |
| Mean throughput gain [%] | 0 | 11 | 0 | 12 |

Abbreviations used in the preceding description include:
3GPP Third Generation Partnership Project
AP Access Point
BSC Base Station Controller
BTS Base Transceiver Station
CDM Code Division Multiplexing
CPE Customer Premises Equipment
CRS Cell Specific Reference Signal
CQI Channel Quality Indicator
CSI Channel State Information
CSI-RS Channel State Information Reference Signal
D2D Device to Device
DAS Distributed Antenna System
DCI Downlink Control Information
DFT Discrete Fourier Transform
DL Downlink
DMRS Demodulation Reference Signal
eNB eNodeB
EPDCCH Enhanced Physical Downlink Control Channel
FDD Frequency Division Duplex
LTE Long Term Evolution
LAN Local Area Network
LEE Laptop Embedded Equipment
LME Laptop Mounted Equipment
MAC Medium Access Control
M2M Machine to Machine
MIMO Multi-Input Multi-Output
MR Measurement Restriction
MTC Machine Type Communication
$N_R$ New Radio
NZP Non-Zero Power
OCC Orthogonal Cover Code
OFDM Orthogonal Frequency Division Multiplexing
PDCCH Physical Downlink Control Channel
PDSCH Physical Downlink Shared Channel
PMI Precoded Matrix Indicator
PRB Physical Resource Block
PSTN Public Switched Telephone Network
PUSCH Physical Uplink Shared Channel
PUCCH Physical Uplink Control Channel
RAN Radio Access Network
RAT Radio Access Technology
RB Resource Block
RBS Radio Base Station
RE Resource Element
RI Rank Indicator
RNC Radio Network Controller
RRC Radio Resource Control
RRH Remote Radio Head
RRU Remote Radio Unit
TDD Time Division Duplex
TFRE Time Frequency Resource Element
TM Transmission Mode
UE User Equipment
UL Uplink
UTRAN Universal Terrestrial Radio Access Network
WAN Wireless Access Network
ZP Zero Power

The invention claimed is:

1. A method for use in a network node of transmitting channel state information reference signals (CSI-RS), the method comprising:
   transmitting, to a wireless device, an indication of a subset of physical resource blocks (PRBs) that the wireless device should use to measure CSI-RS, each CSI-RS associated with an antenna port, the subset of PRBs comprising a subset of the system bandwidth, wherein the indication of the subset of PRBs that the wireless device should use to measure CSI-RS comprises a density value and a comb offset; and
   transmitting CSI-RS on the indicated subset of PRBs.

2. A method for use in a wireless device of receiving channel state information reference signals (CSI-RS), the method comprising:
   receiving an indication of a subset of physical resource blocks (PRBs) that the wireless device should use to measure CSI-RS, each of the CSI-RS associated with an antenna port, the subset of PRBs comprising a subset of the system bandwidth, wherein the indication of the subset of PRBs that the wireless device should use to measure CSI-RS ports comprises a density value and a comb offset; and
   receiving CSI-RS on the indicated subset of PRBs.

3. A network node operable to transmit channel state information reference signals (CSI-RS), the network node comprising processing circuitry, the processing circuitry operable to:

transmit, to a wireless device, an indication of a subset of physical resource blocks (PRBs) that the wireless device should use to measure CSI-RS, each CSI-RS associated with an antenna port, the subset of PRBs comprising a subset of the system bandwidth, wherein the indication of the subset of PRBs that the wireless device should use to measure CSI- RS comprises a density value and a comb offset; and transmit CSI-RS on the indicated subset of PRBs.

4. The network node of claim 3, the processing circuitry further operable to obtain the indication of the subset of PRBs that the wireless device should use to measure CSI-RS.

5. The network node of claim 3, wherein the network node transmits CSI-RS on a total number of antenna ports, and each PRB of the subset of PRBs includes a CSI-RS mapping for the total number of antenna ports.

6. The network node of claim 3, wherein the subset of PRBs that the wireless device should use to measure CSI-RS comprises even numbered PRBs.

7. The network node of claim 3, wherein the subset of PRBs that the wireless device should use to measure CSI-RS comprises odd numbered PRBs.

8. The network node of claim 3, wherein:

the density value comprises a density of ½;

a first comb offset indicates that the wireless device should use the PRBs in a set m1 to measure CSI-RS, wherein the set m1 comprises $\{0, 2, \ldots, N_{RB}^{DL}-2\}$; and a second comb offset indicates that the wireless device should use the PRBs in a set m2 to measure CSI-RS, wherein the set m2 comprises $\{1, 3, \ldots, N_{RB}^{DL}-1\}$.

9. The network node of claim 3, wherein:

the density value comprises a density of ⅓;

a first comb offset indicates that the wireless device should use the PRBs in a set m1 to measure CSI-RS, wherein the set m1 comprises $\{0, 3, \ldots, N_{RB}^{DL}-3\}$;

a second comb offset indicates that the wireless device should use the PRBs in a set m2 to measure CSI-RS, wherein the set m2 comprises $\{1, 4, \ldots, N_{RB}^{DL}-3\}$; and a third comb offset indicates that the wireless device should use the PRBs in a set m3 to measure CSI-RS, wherein the set m3 comprises $\{2, 5, \ldots, N_{RB}^{DL}-1\}$.

10. The network node of claim 3, wherein the indication of the subset of PRBs that the wireless device should use to measure CSI-RS comprises an index value k, the index value k referring to one of a plurality of indications stored at the wireless device.

11. The network node of claim 3, wherein the indication of the subset of PRBs that the wireless device should use to measure CSI-RS further comprises a number of successive CSI-RS subframes in which the wireless device should measure CSI-RS.

12. The network node of claim 3, the processing circuitry further operable to receive, from the wireless device a channel state information (CSI) determined based on measurements of one or more of the transmitted CSI-RS.

13. A wireless device operable to receive channel state information reference signals (CSI-RS), the wireless device comprising processing circuitry, the processing circuitry operable to:

receive an indication of a subset of physical resource blocks (PRBs) that the wireless device should use to measure CSI-RS, each of the CSI-RS associated with an antenna port, the subset of PRBs comprising a subset of the system bandwidth, wherein the indication of the subset of PRBs that the wireless device should use to measure CSI-RS ports comprises a density value and a comb offset; and receive CSI-RS on the indicated subset of PRBs.

14. The wireless device of claim 13, the processing circuitry further operable to:

determine a channel state information (CSI) based on the received CSI-RS; and transmit the CSI to a network node.

15. The wireless device of claim 13, wherein a network node transmits CSI-RS on a total number of antenna ports, and each PRB of the subset of PRBs includes a CSI-RS mapping for the total number of antenna ports.

16. The wireless device of claim 15, wherein the total number of antenna ports is greater than 16.

17. The wireless device of claim 16, wherein the indication of the subset of PRBs that the wireless device should use to measure CSI-RS further comprises a number of successive CSI-RS subframes that the wireless device should measure CSI-RS.

18. The wireless device of claim 17, the processing circuitry further operable to determine a channel state information (CSI) based on the received CSI-RS over the number of successive CSI-RS subframes.

19. The wireless device of claim 13, wherein the subset of PRBs that the wireless device should use to measure CSI-RS comprises even numbered PRBs.

20. The wireless device of claim 13, wherein the subset of PRBs that the wireless device should use to measure CSI-RS comprises odd numbered PRBs.

21. The wireless device of claim 13, wherein:

the density value comprises a density of ½;

a first comb offset indicates that the wireless device should use the PRBs in a set m1 to measure CSI-RS, wherein the set m1 comprises $\{0, 2, \ldots, N_{RB}^{DL}-2\}$; and a second comb offset indicates that the wireless device should use the PRBs in a set m2 to measure CSI-RS, wherein the set m2 comprises $\{1, 3, \ldots, N_{RB}^{DL}-1\}$.

22. The wireless device of claim 13, wherein:

the density value comprises a density of ⅓;

a first comb offset indicates that the wireless device should use the PRBs in a set m1 to measure CSI-RS, wherein the set m1 comprises $\{0, 3, \ldots, N_{RB}^{DL}-3\}$;

a second comb offset indicates that the wireless device should use the PRBs in a set m2 to measure CSI-RS, wherein the set m2 comprises $\{1, 4, \ldots, N_{RB}^{DL}-2\}$; and a third comb offset indicates that the wireless device should use the PRBs in a set m3 to measure CSI-RS, wherein the set m3 comprises $\{2, 5, \ldots, N_{RB}^{DL}-1\}$.

23. The wireless device of claim 13, wherein the indication of the subset of PRBs that the wireless device should use to measure CSI-RS comprises an index value k, the index value k referring to one of a plurality of indications stored at the wireless device.

* * * * *

UNITED STATES PATENT AND TRADEMARK OFFICE
CERTIFICATE OF CORRECTION

PATENT NO. : 10,833,747 B2
APPLICATION NO. : 16/301219
DATED : November 10, 2020
INVENTOR(S) : Muruganathan et al.

It is certified that error appears in the above-identified patent and that said Letters Patent is hereby corrected as shown below:

In the Specification

In Column 1, Line 59, delete "reference to" and insert -- referred to --, therefor.

In Column 1, Line 65, delete "Tsubframe=1 ms." and insert -- $T_{subframe}=1$ ms. --, therefor.

In Column 2, Lines 26-27, delete "cell specific reference symbols (CRS)" and insert -- cell specific reference signals (CRS) --, therefor.

In Column 2, Line 64, delete "DCI IC carries" and insert -- DCI 1C carries --, therefor.

In Column 5, Line 9, delete "ID port" and insert -- 1D port --, therefor.

In Column 5, Line 51, delete "cell-specific reference symbols (CRS)" and insert -- cell specific reference signals (CRS) --, therefor.

In Column 8, Line 4, in Equation 3, delete "$a_{k,l}^{(p')}=w_{p''}\cdot r_{l,n_s}(m')$," and insert -- $a_{k,l}^{(p')}=w_{p''}\cdot r_{l,n_s}(m')$ --, therefor.

In Column 8, Lines 9-20, in Equation 4, delete

Signed and Sealed this
Eighth Day of June, 2021

Drew Hirshfeld
*Performing the Functions and Duties of the
Under Secretary of Commerce for Intellectual Property and
Director of the United States Patent and Trademark Office*

"
$$k' + 12m + \begin{cases} -0 & \text{for } p' \in \{15, 16\}, \text{normal cyclic prefix} \\ -6 & \text{for } p' \in \{17, 18\}, \text{normal cyclic prefix} \\ -1 & \text{for } p' \in \{19, 20\}, \text{normal cyclic prefix} \\ -7 & \text{for } p' \in \{21, 22\}, \text{normal cyclic prefix} \\ -0 & \text{for } p' \in \{15, 16\}, \text{extended cyclic prefix} \\ -3 & \text{for } p' \in \{17, 18\}, \text{extended cyclic prefix} \\ -6 & \text{for } p' \in \{19, 20\}, \text{extended cyclic prefix} \\ -9 & \text{for } p' \in \{21, 22\}, \text{extended cyclic prefix} \end{cases}$$
" and insert $$k = k' + 12m + \begin{cases} -0 & \text{for } p' \in \{15, 16\}, \text{normal cyclic prefix} \\ -6 & \text{for } p' \in \{17, 18\}, \text{normal cyclic prefix} \\ -1 & \text{for } p' \in \{19, 20\}, \text{normal cyclic prefix} \\ -7 & \text{for } p' \in \{21, 22\}, \text{normal cyclic prefix} \\ -0 & \text{for } p' \in \{15, 16\}, \text{extended cyclic prefix} \\ -3 & \text{for } p' \in \{17, 18\}, \text{extended cyclic prefix} \\ -6 & \text{for } p' \in \{19, 20\}, \text{extended cyclic prefix} \\ -9 & \text{for } p' \in \{21, 22\}, \text{extended cyclic prefix} \end{cases}$$
--, therefor.

In Column 8, Line 34, in Equation 4, delete "$m = 0, 1, \ldots, N_{RB}^{DL} - 1$" and insert -- $m = 0, 1, \ldots, N_{RB}^{DL} - 1$ --, therefor.

In Column 11, Line 11, delete "$m = 0, 1, \ldots, N_{RB}^{DL} - 1$" and insert -- $m = 0, 1, \ldots, N_{RB}^{DL} - 1$ --, therefor.

In Column 11, Line 19, delete "K' and I'" and insert -- K' and l' --, therefor.

In Column 11, Line 57, delete "In $N_R$," and insert -- In NR, --, therefor.

In Column 12, Line 23, delete "factor K-=3" and insert -- factor K=3 --, therefor.

In Column 13, Line 47, delete "interferenceMeasRestrIction" and insert -- interferenceMeasRestriction --, therefor.

In Column 14, Line 31, delete "MR sets" and insert -- MR_sets --, therefor.

In Column 18, Lines 15-16, delete "Channel State Information Reference Symbols" and insert -- Channel State Information Reference Signals --, therefor.

In Column 19, Lines 22-27, delete "In some . . . . . subframe." and insert the same at Line

CERTIFICATE OF CORRECTION (continued)
U.S. Pat. No. 10,833,747 B2

21, after "period P." as a continuation paragraph.

In Column 22, Lines 9-10, delete "PRBs 16a represent PRBs with no NZP CSI-RS" and insert -- PRBs 16b represent PRBs with no NZP CSI-RS --, therefor.

In Column 22, Line 10-11, delete "PRBs 16b represent PRBs for CSI measurement with NZP CSI-RS" and insert -- PRBs 16a represent PRBs for CSI measurement with NZP CSI-RS --, therefor.

In Column 23, Line 23, delete "CSI-RS Resource_Set2." and insert -- CSI-RS_Resource_Set2. --, therefor.

In Column 23, Line 25, delete "CSI-RS Resource_Set2" and insert -- CSI-RS_Resource_Set2 --, therefor.

In Column 24, Lines 7-13, in Equation 11, delete
"$$p = \begin{cases} p' + \frac{N_{ports}^{CSI}}{2} i'' & \text{for } p' \in \left\{ \begin{array}{c} 15, \ldots, 15 + \\ N_{ports}^{CSI}/2 - 1 \end{array} \right\} \\ p' + \frac{N_{ports}^{CSI}}{2}(i'' + N_{res}^{CSI} - 1) & \text{for } p' \in \left\{ \begin{array}{c} 15 + N_{ports}^{CSI}/2, \ldots, \\ 15 + N_{ports}^{CSI} - 1 \end{array} \right\} \end{cases}$$" and insert
"$$p = \begin{cases} p' + \frac{N_{ports}^{CSI}}{2} i'' & \text{for } p' \in \left\{ \begin{array}{c} 15, \ldots, 15 + \\ N_{ports}^{CSI}/2 - 1 \end{array} \right\} \\ p' + \frac{N_{ports}^{CSI}}{2}(i'' + N_{res}^{CSI} - 1) & \text{for } p' \in \left\{ \begin{array}{c} 15 + N_{ports}^{CSI}/2, \ldots, \\ 15 + N_{ports}^{CSI} - 1 \end{array} \right\} \end{cases}$$" --, therefor.

In Column 24, Line 25, delete "CSI-RS ports 31-3" and insert -- CSI-RS ports 31-38 --, therefor.

In Column 24, Line 31, delete "i"∈{2,3})" and insert -- i"∈{2,3}). --, therefor.

In Column 25, Line 8, delete "the $k_{th}$" and insert -- the $k^{th}$ --, therefor.

In Column 25, Line 11, in Equation 15, delete "m∈MR_Set$A$" and insert -- m∈MR_Set$k$ --, therefor.

In Column 25, Line 11, in Equation 15, delete "i"∈CSI-RS_Resourc e_Set$k$" and insert -- i"∈CSI-RS_Resource_Set$k$ --, therefor.

In Column 25, Line 14, delete "CSI-RS port_set1={15-30}" and insert -- CSI-RS_port_set1={15-30} --, therefor.

In Column 26, Line 33, delete "wireless device 100." and insert -- wireless device 110. --, therefor.

In Column 27, Line 1, delete "respect FIGS." and insert -- respect to FIGS. --, therefor.

In Column 27, Line 36, delete "machine type (MTC)" and insert -- machine type communication (MTC) --, therefor.

In Column 27, Line 45, delete "from wireless network node 120" and insert -- from network node 120 --, therefor.

In Column 29, Line 7, delete "remote RF unit (RRU)," and insert -- remote radio unit (RRU), --, therefor.

In Column 30, Line 15, delete "processor 1920." and insert -- processor 2020. --, therefor.

In Column 35, Line 59, delete "$N_R$ New Radio" and insert -- NR New Radio --, therefor.

In the Claims

In Column 37, Line 11, in Claim 3, delete "CSI- RS" and insert -- CSI-RS --, therefor.

In Column 37, Line 35, in Claim 8, delete "set m2to" and insert -- set m2 to --, therefor.

In Column 37, Line 44, in Claim 9, delete "$\{1, 4, \ldots, N_{RB}^{DL}-3\};$" and insert -- $\{1, 4, \ldots, N_{RB}^{DL}-2\};$ --, therefor.